United States Patent
Ikeda

(10) Patent No.: US 10,317,221 B2
(45) Date of Patent: Jun. 11, 2019

(54) DATA PROCESSING SYSTEM

(71) Applicant: SEMICONDUCTOR ENERGY LABORATORY CO., LTD., Atsugi-shi, Kanagawa-ken (JP)

(72) Inventor: Takayuki Ikeda, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 0 days.

(21) Appl. No.: 15/667,761

(22) Filed: Aug. 3, 2017

(65) Prior Publication Data
US 2018/0038699 A1 Feb. 8, 2018

(30) Foreign Application Priority Data

Aug. 5, 2016 (JP) .................. 2016-154192

(51) Int. Cl.
*G06F 17/00* (2019.01)
*G06T 11/00* (2006.01)
*G01C 21/32* (2006.01)
*H04N 13/156* (2018.01)
*H04N 13/275* (2018.01)
(Continued)

(52) U.S. Cl.
CPC ............. *G01C 21/32* (2013.01); *A63F 13/26* (2014.09); *A63F 13/92* (2014.09); *G01C 21/20* (2013.01); *G06F 1/1616* (2013.01); *G06F 1/3206* (2013.01); *G06F 1/3265* (2013.01); *G06F 3/011* (2013.01); *G06F 3/1423* (2013.01); *G06F 16/00* (2019.01); *G06T 19/006* (2013.01); *G09G 5/397* (2013.01); *H04N 13/156* (2018.05); *H04N 13/275* (2018.05); *A63F 13/95* (2014.09); *A63F 2300/204* (2013.01);
(Continued)

(58) Field of Classification Search
CPC .... G01C 21/32; G01C 21/20; H04N 13/1561; H04N 12/275; A63F 13/26; A63F 13/92; G06F 1/1616; G06F 13/011; G06F 3/1423; G06F 1/3206; G06F 1/3265; G06F 16/00; G06T 19/006
USPC ...................................... 365/189.05; 715/230
See application file for complete search history.

(56) References Cited

U.S. PATENT DOCUMENTS

| | | | | |
|---|---|---|---|---|
| 5,495,576 A | * | 2/1996 | Ritchey | ................... G06T 17/00 345/420 |
| 6,124,862 A | * | 9/2000 | Boyken | ..................... G06T 7/20 345/419 |

(Continued)

FOREIGN PATENT DOCUMENTS

| JP | 2012-094100 A | 5/2012 |
|---|---|---|
| WO | WO-2015/129045 | 9/2015 |

*Primary Examiner* — Viet Q Nguyen
(74) *Attorney, Agent, or Firm* — Nixon Peabody LLP; Jeffrey L. Costellia

(57) ABSTRACT

An object is to provide a novel data processing system. The data processing system includes a portable terminal, a network, a server, and a database. The portable terminal transmits position information to the server through the network. The server transmits, to the portable terminal through the network, a plurality of pieces of object data corresponding to the position information obtained from the database. Imaging data obtained by the portable terminal and the plurality of pieces of object data are compared, and when there is a piece of the object data that does not match the imaging data, the mismatched piece of the object data stored in the database is updated.

15 Claims, 22 Drawing Sheets

(51) Int. Cl.
*A63F 13/26* (2014.01)
*A63F 13/92* (2014.01)
*G01C 21/20* (2006.01)
*G06F 1/16* (2006.01)
*G06F 3/01* (2006.01)
*G06F 3/14* (2006.01)
*G06T 19/00* (2011.01)
*G09G 5/397* (2006.01)
*G06F 1/3206* (2019.01)
*G06F 1/3234* (2019.01)
*G06F 16/00* (2019.01)
*H04N 13/356* (2018.01)
*A63F 13/95* (2014.01)

(52) U.S. Cl.
CPC ............ *G06F 2200/1612* (2013.01); *G06F 2200/1637* (2013.01); *H04N 13/356* (2018.05); *Y02D 10/153* (2018.01)

(56) References Cited

U.S. PATENT DOCUMENTS

| | | | | |
|---|---|---|---|---|
| 6,212,441 | B1* | 4/2001 | Hazama | G05B 19/4097 700/98 |
| 7,928,977 | B2* | 4/2011 | Tanimura | G06F 3/011 345/419 |
| 9,424,461 | B1* | 8/2016 | Yuan | G06K 9/00201 |
| 9,437,045 | B2* | 9/2016 | Arendash | G06T 19/006 |
| 9,501,498 | B2* | 11/2016 | Wnuk | G06F 17/30268 |
| 9,679,227 | B2* | 6/2017 | Taylor | G01C 11/06 |
| 9,767,615 | B2* | 9/2017 | Young | G06K 9/46 |
| 9,953,438 | B2* | 4/2018 | Sbaiz | H04N 1/00323 |
| 9,984,499 | B1* | 5/2018 | Jurgenson | G06T 17/00 |
| 10,013,633 | B1* | 7/2018 | Manmatha | G06T 7/0004 |
| 2004/0247174 | A1* | 12/2004 | Lyons | G06F 3/04845 382/154 |
| 2005/0151743 | A1* | 7/2005 | Sitrick | G09G 5/377 345/473 |
| 2008/0221843 | A1* | 9/2008 | Shenkar | G06T 17/05 703/1 |
| 2009/0184865 | A1* | 7/2009 | Valo | G01S 7/412 342/25 F |
| 2011/0298823 | A1 | 12/2011 | Kitahara | |
| 2011/0304701 | A1 | 12/2011 | Ito | |
| 2011/0304702 | A1 | 12/2011 | Ito | |
| 2011/0304703 | A1 | 12/2011 | Ito | |
| 2011/0306412 | A1 | 12/2011 | Ehara et al. | |
| 2012/0075285 | A1 | 3/2012 | Oyagi et al. | |
| 2012/0075430 | A1 | 3/2012 | Ito et al. | |
| 2012/0113228 | A1 | 5/2012 | Konno et al. | |
| 2013/0201293 | A1 | 8/2013 | Konno et al. | |
| 2013/0300740 | A1* | 11/2013 | Snyder | G06F 3/016 345/420 |
| 2014/0125651 | A1* | 5/2014 | Sharp | G06T 15/04 345/419 |
| 2015/0023602 | A1* | 1/2015 | Wnuk | G06F 17/30247 382/190 |
| 2017/0011270 | A1 | 1/2017 | Kamada | |

\* cited by examiner

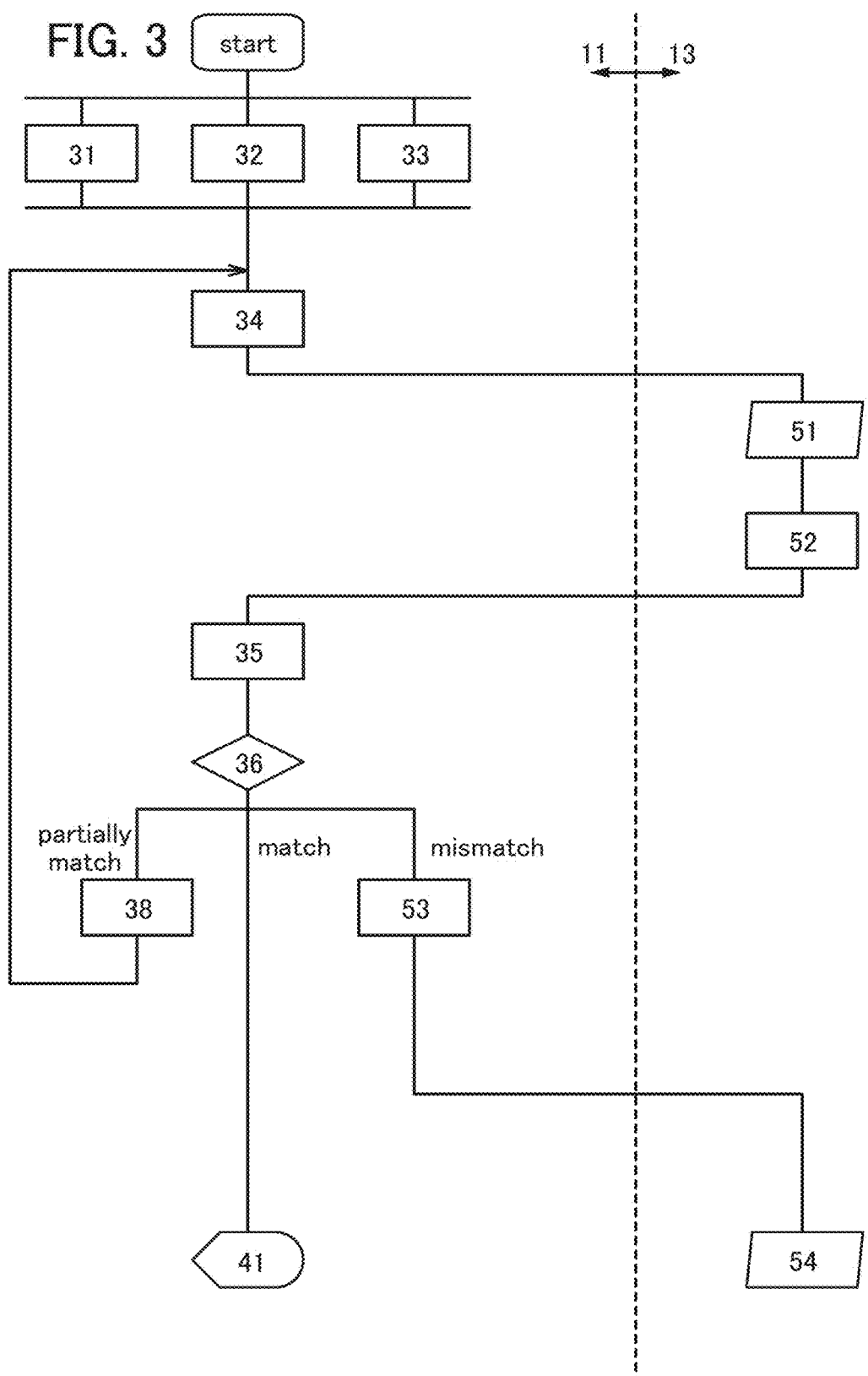

406

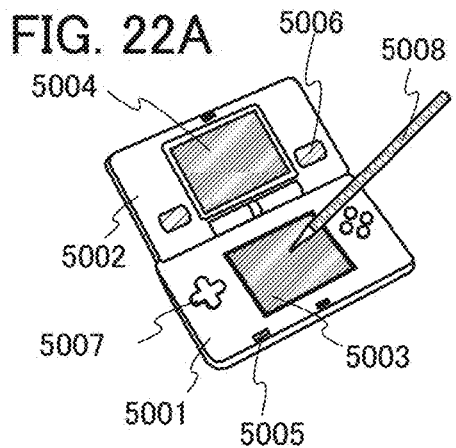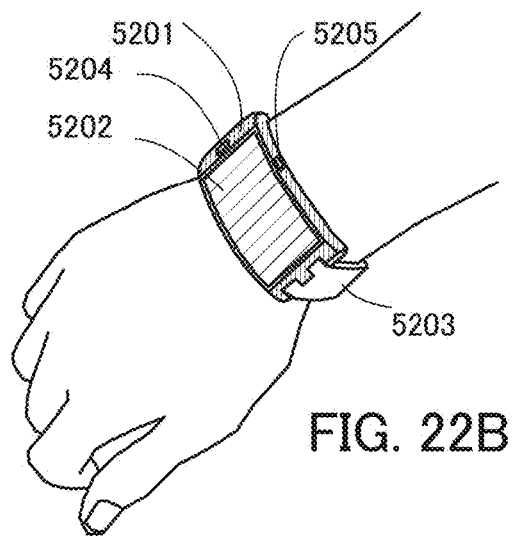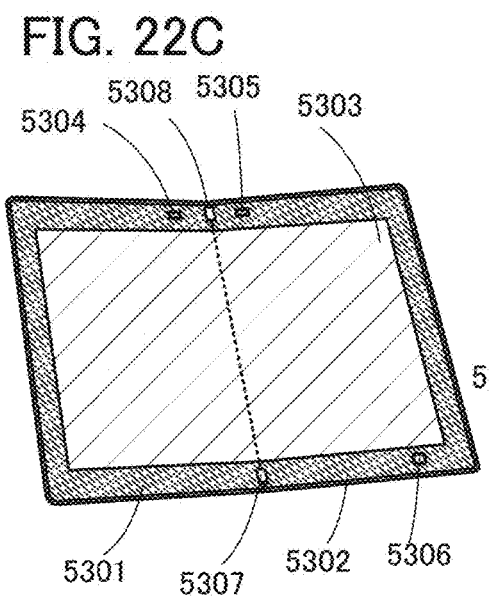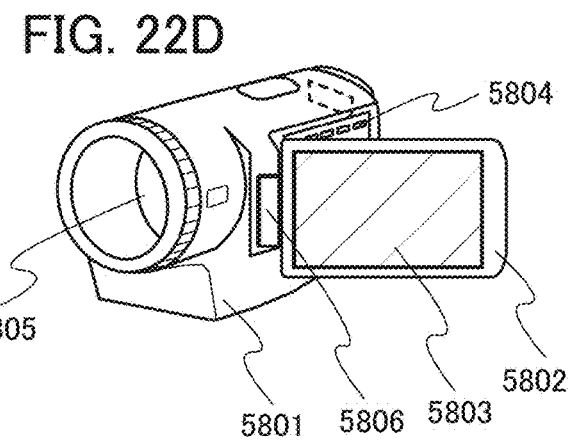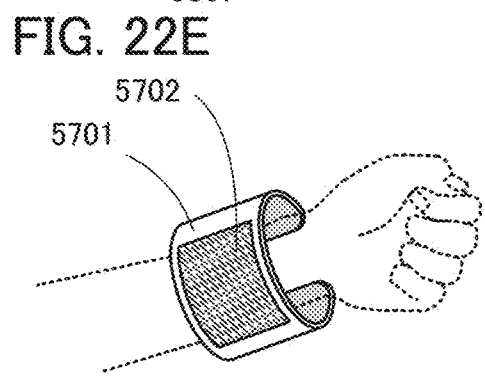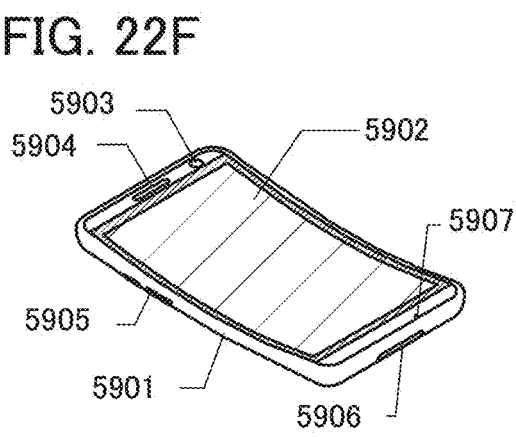

DATA PROCESSING SYSTEM

BACKGROUND OF THE INVENTION

1. Field of the Invention

One embodiment of the present invention relates to a data processing system.

2. Description of the Related Art

There has been suggested an image display system that recognizes an object from imaging data obtained by imaging and performs display in combination with a virtual object in a virtual space (see Patent Document 1). In the structure of Patent Document 1, a marker provided in advance is detected from imaging data, and display is performed in combination with a virtual object in a virtual space.

PATENT DOCUMENT

Patent Document 1: Japanese Published Patent Application No. 2012-094100

SUMMARY OF THE INVENTION

In a method for recognizing an object by detecting a maker as in Patent Document 1, there is a limitation on recognizable objects; thus, functions of performing augmented reality (AR) display are limited.

In a method for performing image recognition with a portable terminal by using imaging data, the amount of arithmetic operation increases, resulting in high power consumption and delay in image display.

In a method for performing image recognition on a server by transmitting imaging data to the server, the amount of data traffic increases. Moreover, a privacy issue or the like occurs because imaging data including an image of a stranger is sometimes transmitted to the server without being processed.

An object of one embodiment of the present invention is to provide a novel data processing system capable of highly convenient AR display. Another object of one embodiment of the present invention is to provide a novel data processing system achieving low power consumption. Another object of one embodiment of the present invention is to provide a novel data processing system in which delay in image display is less likely to occur. Another object of one embodiment of the present invention is to provide a novel data processing system in which a privacy issue is less likely to occur. Another object of one embodiment of the present invention is to provide a novel data processing system capable of reducing the amount of data traffic. Another object of one embodiment of the present invention is to provide a novel data processing system.

One embodiment of the present invention is a data processing system including a portable terminal, a network, a server, and a database. Position information is transmitted from the portable terminal to the server through the network. A plurality of pieces of object data corresponding to the position information obtained from the database are transmitted from the server to the portable terminal through the network. Imaging data obtained by the portable terminal and the plurality of pieces of object data are compared, and when some of the plurality of pieces of object data does not match the imaging data, the mismatched piece of the object data stored in the database is updated.

One embodiment of the present invention is a data processing system including a portable terminal, a network, a server, and a database. Position information is transmitted from the portable terminal to the server through the network. A plurality of pieces of object data corresponding to the position information obtained from the database are transmitted from the server to the portable terminal through the network. Imaging data obtained by the portable terminal and the plurality of pieces of object data are compared; the position information is corrected on the basis of one of the plurality of pieces of object data matching the imaging data; and when some of the plurality of pieces of object data does not match the imaging data, the mismatched piece of the object data stored in the database is updated.

In the data processing system of one embodiment of the present invention, it is preferred that the corrected position information be transmitted from the portable terminal to the server through the network, and that the corrected position information obtained from the database be transmitted from the server to the portable terminal through the network.

In the data processing system of one embodiment of the present invention, the position information preferably contains information on a direction in which the portable terminal performs imaging.

In the data processing system of one embodiment of the present invention, it is preferred that the database include three-dimensional data represented by a wire-frame model; and that the server generate two-dimensional data of the plurality of pieces of object data by projecting the three-dimensional data on a two-dimensional plane corresponding to the position information, and transmit the two-dimensional data to the portable terminal through the network.

Note that other embodiments of the present invention will be shown in the following embodiments and the drawings.

One embodiment of the present invention can provide a novel data processing system capable of highly convenient AR display. One embodiment of the present invention can provide a novel data processing system achieving low power consumption. One embodiment of the present invention can provide a novel data processing system in which delay in image display is less likely to occur. One embodiment of the present invention can provide a novel data processing system in which a privacy issue is less likely to occur. One embodiment of the present invention can provide a novel data processing system capable of reducing the amount of data traffic. One embodiment of the present invention can provide a novel data processing system.

BRIEF DESCRIPTION OF THE DRAWINGS

In the accompanying drawings:

FIG. 3 illustrates one embodiment of the present invention;

FIGS. 22A to 22F illustrate examples of electronic devices.

DETAILED DESCRIPTION OF THE INVENTION

Figure 1:
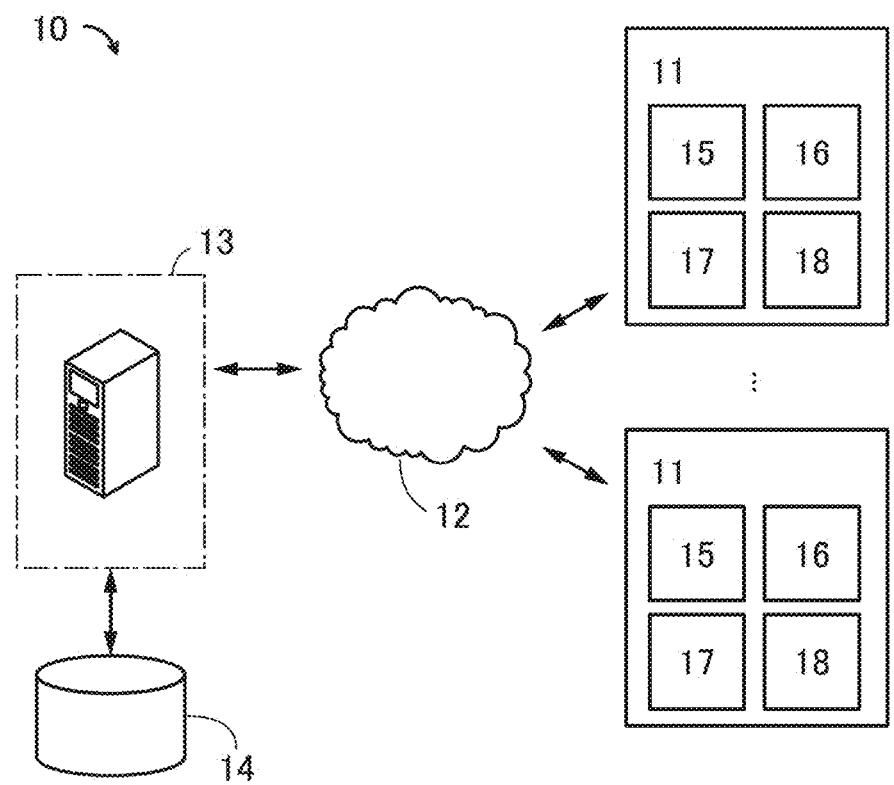
FIG. 1 illustrates one embodiment of the present invention.

Embodiments of the present invention will be hereinafter described in detail with reference to the accompanying drawings. Note that the present invention is not limited to the following description, and it is easily understood by those skilled in the art that the mode and details can be variously changed without departing from the scope and spirit of the present invention. Accordingly, the present invention should not be construed as being limited to the description of the embodiments below.

In this specification and the like, a semiconductor device refers to a device that utilizes semiconductor characteristics, and means a circuit including a semiconductor element (e.g., a transistor or a diode), a device including the circuit, and the like. The semiconductor device also means any device that can function by utilizing semiconductor characteristics. For example, an integrated circuit, and a chip including an integrated circuit are semiconductor devices. Moreover, a memory device, a display device, a light-emitting device, a lighting device, an electronic device, and the like themselves may be semiconductor devices or may each include a semiconductor device.

A description "X and Y are connected" in this specification and the like means that X and Y are electrically connected, X and Y are functionally connected, and X and Y are directly connected. Accordingly, without being limited to a predetermined connection relation, for example, a connection relation shown in drawings or texts, another connection relation is included in the drawings or the texts. Here, X and Y each denote an object (e.g., a device, an element, a circuit, a wiring, an electrode, a terminal, a conductive film, or a layer).

A transistor has three terminals: a gate, a source, and a drain. A gate is a node that controls the conduction state of a transistor. Depending on the channel type of a transistor or levels of potentials supplied to the terminals, one of two input/output nodes functions as a source and the other functions as a drain. Therefore, the terms "source" and "drain" can be switched in this specification and the like. In this specification and the like, the two terminals other than the gate may be referred to as a first terminal and a second terminal.

A node can be referred to as a terminal, a wiring, an electrode, a conductive layer, a conductor, an impurity region, or the like depending on the circuit configuration, the device structure, or the like. Furthermore, a terminal, a wiring, or the like can be referred to as a node.

A voltage often refers to a potential difference between a certain potential and a reference potential (e.g., a ground potential (GND) or a source potential). Thus, a voltage can be referred to as a potential. Note that a potential indicates a relative value; hence, "ground potential" does not necessarily mean 0 V.

In this specification and the like, the terms "film" and "layer" can be interchanged depending on the case or circumstances. For example, in some cases, the term "conductive film" can be used instead of "conductive layer," and the term "insulating layer" can be used instead of "insulating film."

In this specification and the like, ordinal numbers such as first, second, and third are used to avoid confusion among components, and the terms do not limit the components numerically or do not limit the order.

In the drawings, the size, the layer thickness, or the region is exaggerated for clarity in some cases; therefore, the size, the layer thickness, or the region is not limited to the illustrated scale. Note that the drawings are schematic views showing ideal examples, and embodiments of the present invention are not limited to shapes or values shown in the drawings. For example, the following can be included: variation in signal, voltage, or current due to noise or difference in timing.

In this specification and the like, terms for describing arrangement, such as "over" and "under," are used for convenience to describe the positional relation between components with reference to drawings in some cases. Furthermore, the positional relation between components is changed as appropriate in accordance with a direction in which each component is described. Thus, the positional relation is not limited by a term used in the specification and can be described with another term as appropriate depending on the situation.

Note that the layout of circuit blocks in a block diagram specifies the positional relation for description. Even when a diagram shows that different functions are achieved by different circuit blocks, one circuit block may be actually configured to achieve the different functions. Functions of circuit blocks are specified for description, and even when a diagram shows one circuit block performing given processing, a plurality of circuit blocks may be actually provided to perform the processing.

In this specification and the like, a metal oxide means an oxide of metal in a broad sense. Metal oxides are classified into an oxide insulator, an oxide conductor (including a transparent oxide conductor), an oxide semiconductor (also simply referred to as OS), and the like. For example, a metal oxide used in a semiconductor layer of a transistor is called an oxide semiconductor in some cases. That is to say, a metal oxide that has at least one of an amplifying function, a rectifying function, and a switching function can be called a metal oxide semiconductor, or OS for short. In addition, an OS FET is a transistor including a metal oxide or an oxide semiconductor.

In this specification and the like, a metal oxide including nitrogen is also called a metal oxide in some cases. Moreover, a metal oxide including nitrogen may be called a metal oxynitride.

In this specification and the like, "c-axis-aligned crystal (CAAC)" or "cloud-aligned composite (CAC)" may be stated. Note that CAAC refers to an example of a crystal structure, and CAC refers to an example of a function or a material composition.

In this specification and the like, a CAC-OS or a CAC metal oxide has a conducting function in a part of the material and has an insulating function in another part of the material; as a whole, the CAC-OS or the CAC metal oxide has a function of a semiconductor. In the case where the CAC-OS or the CAC metal oxide is used in a semiconductor layer of a transistor, the conducting function is to allow electrons (or holes) serving as carriers to flow, and the insulating function is to not allow electrons serving as carriers to flow. By the complementary action of the conducting function and the insulating function, the CAC-OS or the CAC metal oxide can have a switching function (on/off function). In the CAC-OS or CAC-metal oxide, separation of the functions can maximize each function.

In this specification and the like, the CAC-OS or the CAC metal oxide includes conductive regions and insulating regions. The conductive regions have the above-described conducting function, and the insulating regions have the above-described insulating function. In some cases, the conductive regions and the insulating regions in the material are separated at the nanoparticle level. In some cases, the conductive regions and the insulating regions are unevenly distributed in the material. The conductive regions are sometimes observed to be coupled in a cloud-like manner with their boundaries blurred.

Furthermore, in the CAC-OS or the CAC metal oxide, the conductive regions and the insulating regions each have a size of more than or equal to 0.5 nm and less than or equal to 10 nm, preferably more than or equal to 0.5 nm and less than or equal to 3 nm and are dispersed in the material in some cases.

The CAC-OS or the CAC metal oxide includes components having different bandgaps. For example, the CAC-OS or the CAC metal oxide includes a component having a wide gap due to the insulating region and a component having a narrow gap due to the conductive region. With such a composition, carriers mainly flow in the component having a narrow gap. The component having a narrow gap complements the component having a wide gap, and carriers also flow in the component having a wide gap in conjunction with the component having a narrow gap. Therefore, when the above-described CAC-OS or CAC metal oxide is used in a channel region of a transistor, high current drive capability in the on state of the transistor, that is, high on-state current and high field-effect mobility can be obtained.

In other words, a CAC-OS or a CAC metal oxide can be called a matrix composite or a metal matrix composite.

Embodiment 1

A data processing system of one embodiment of the present invention will be described. Note that in this specification and the like, a data processing system refers to a system for storing data applicable to arithmetic processing for realizing augmented reality, virtual reality, or the like in a database connected to a server.

FIG. 1 illustrates a data processing system 10 of one embodiment of the present invention. The data processing system 10 in FIG. 1 includes portable terminals 11, a network 12, a server 13, and a database 14.

The portable terminal 11 is an electronic device including a display 15, a position sensor 16, an arithmetic device 17, and an imaging device 18. Note that the portable terminal 11 also includes a plurality of devices such as a communication device and a battery.

The display 15 is capable of displaying images corresponding to the user's operation, such as an image received from the server 13 and an image based on imaging data obtained by the imaging device 18. The display 15 is a device including display elements such as a liquid crystal element and/or a light-emitting element and is also referred to as a display device.

The position sensor 16 refers to a direction sensor for obtaining information on the direction and orientation of the portable terminal 11 (a magnetic field sensor or a gyro sensor), as well as a global positioning system (GPS) for obtaining position information.

The arithmetic device 17 performs arithmetic processing on data for a central processing unit (CPU), a field-programmable gate array (FPGA), or the like. For example, the arithmetic device 17 is capable of comparing imaging data with data stored in the database 14 and determining whether the two pieces of data match or not.

The imaging device 18 can be, for example, an image sensor using a charge-coupled device (CCD) or a complementary metal-oxide-semiconductor (CMOS). When an image sensor is used as the imaging device 18, an image processing circuit such as an analog-to-digital converter circuit may be provided.

The network 12 corresponds to a computer network such as the Internet, which is the infrastructure of the World Wide Web (WWW), an intranet, an extranet, a personal area network (PAN), a local area network (LAN), a campus area network (CAN), a metropolitan area network (MAN), a wide area network (WAN), or a global area network (GAN).

The server 13 corresponds to a computer that accesses data stored in the database 14. As the server 13, a plurality of servers may be connected to each other through the network 12. Specifically, the server 13 inputs and outputs data for creating augmented reality or virtual reality and performs arithmetic operation on such data.

Note that data is communicated between the server 13 and the database 14 as needed. Accordingly, in some cases, a description of data access from the server 13 to the database 14 is omitted, and data in the database 14 is regarded as data of the server 13.

The database 14 stores data output from the server 13. Moreover, the database 14 outputs necessary data in response to access from the server 13. The database 14 should be capable of storing large-volume data. The database 14 is preferably a hard disk drive (HDD) or a flash memory. A flash memory is particularly preferable because it has excellent quietness and impact resistance and is superior to an HDD in access speed. Specifically, the database 14 stores data for creating augmented reality or virtual reality.

Next, data in the server 13 and data in the database 14 will be described.

Figure 2:
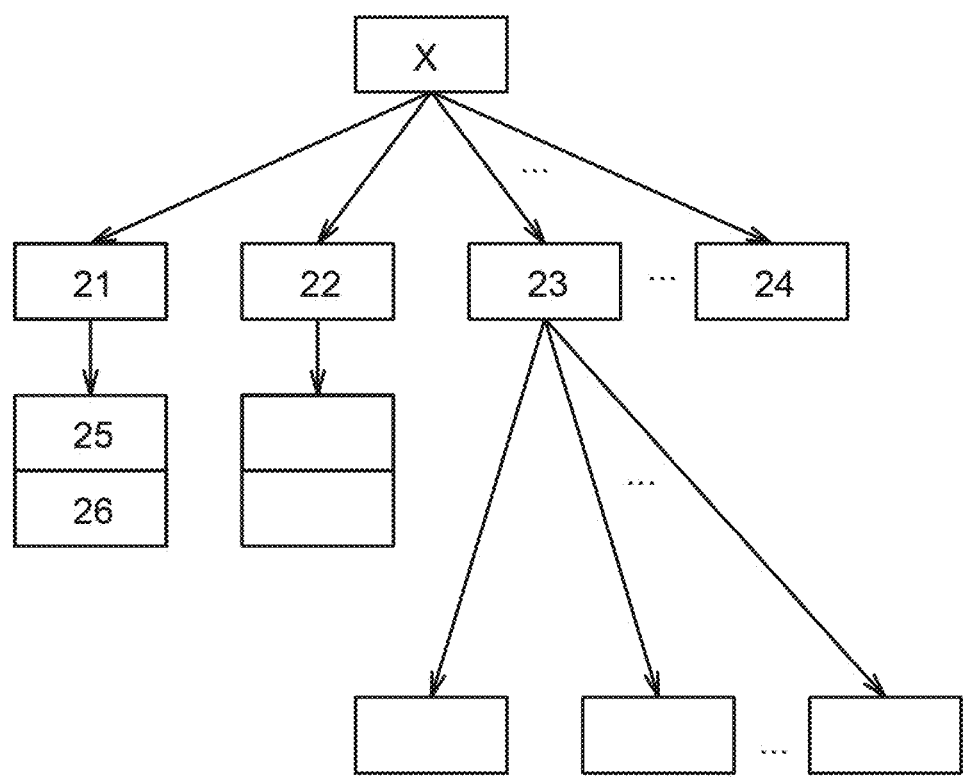
FIG. 2 illustrates one embodiment of the present invention.

The server 13 contains data on an object (also referred to as information or object data) corresponding to position information. An aggregation of object data is represented by $X=\{x_0, x_1, \ldots, x_{N-1}\}$. For example, $x_0$ represents a sphere, and $x_1$ represents a cube. The aggregation X of object data is shown by an octree illustrated in FIG. 2, for instance. The aggregation X is divided into a plurality of regions, e.g., object data 21 to object data 24. The object data 21 and the object data 22 each represent a region that cannot be further divided. In contrast, the object data 23 represents a region that can be further divided into a plurality of pieces of object data. For example, the object data 21 corresponds to $x_0$ described above.

Each object data can represent information on an object shape with the use of data represented by a wire-frame model. Wire-frame model data is denoted by reference numeral 25. In addition to the information on an object shape, each object data contains information that can be related to the corresponding object; such related information is denoted by reference numeral 26 (hereinafter "related data 26") in FIG. 2. Examples of the related data 26 include the name of an object and information related to the object.

Figure 4A:
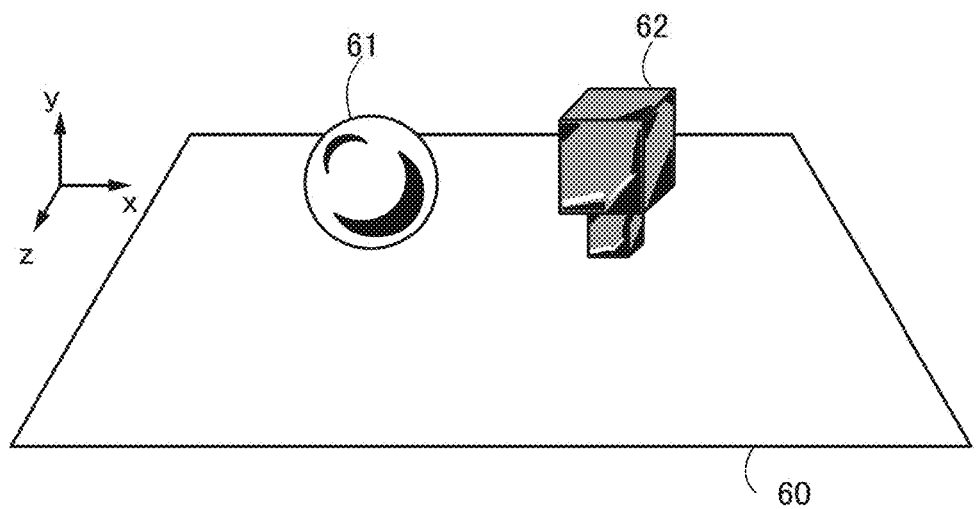
FIGS. 4A and 4B illustrate one embodiment of the present invention.

A specific example of wire-frame model data will be described with reference to FIGS. 4A and 4B. As an example, FIG. 4A shows an object 61 and an object 62 in a given real region 60 in a three-dimensional manner. For explanation, the object 61 has a spherical shape, and the object 62 has a shape obtained by combining a large cube and a small cube.

Figure 4B:
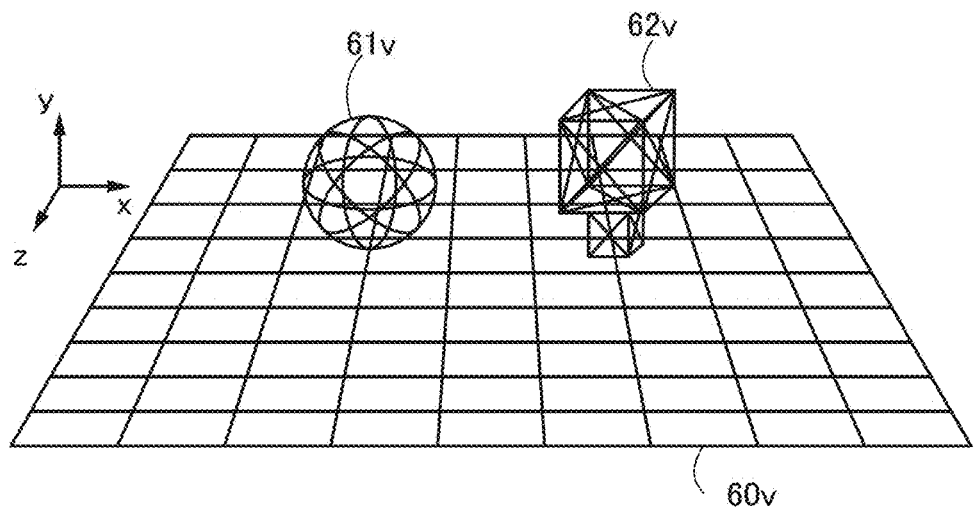

The x direction, the y direction, and the z direction are shown in FIGS. 4A and 4B. The x direction represents a horizontal direction, the y direction represents a vertical direction, and the z direction represents a depth direction.

FIG. 4B visualizes wire-frame model data corresponding to FIG. 4A. As an example, FIG. 4B illustrates a region 60v in a virtual space that corresponds to the real region 60. Object data 61v and object data 62v in the region 60v are object data corresponding to the real object 61 and object data corresponding to the real object 62, respectively. The object data 61v has a spherical shape corresponding to the object 61. The object data 62v has a shape obtained by combining a large cube and a small cube, which corresponds to the object 62.

When the server 13 is supplied with position information including direction information from the portable terminal 11 through the network 12, the server 13 accesses the database 14 and generates two-dimensional data from the aggregation X.

A specific example of two-dimensional data generated from the aggregation X will be described with reference to FIGS. 5A to 5C. As an example, FIG. 5A shows a user 65 positioned at coordinates 67 in the given real region 60, and the user 65 holds the portable terminal 11 toward a direction 66.

Note that the coordinates 67 are obtained, for example, by calculating a distance from the time it takes for signals 64 transmitted from a plurality of navigation satellites with time and ranging (NAVSTARs) 63 to reach the portable terminal 11. The direction 66 is obtained by calculation based on data measured with the direction sensor (the magnetic field sensor or the gyro sensor) provided in the portable terminal 11.

Figure 5A:
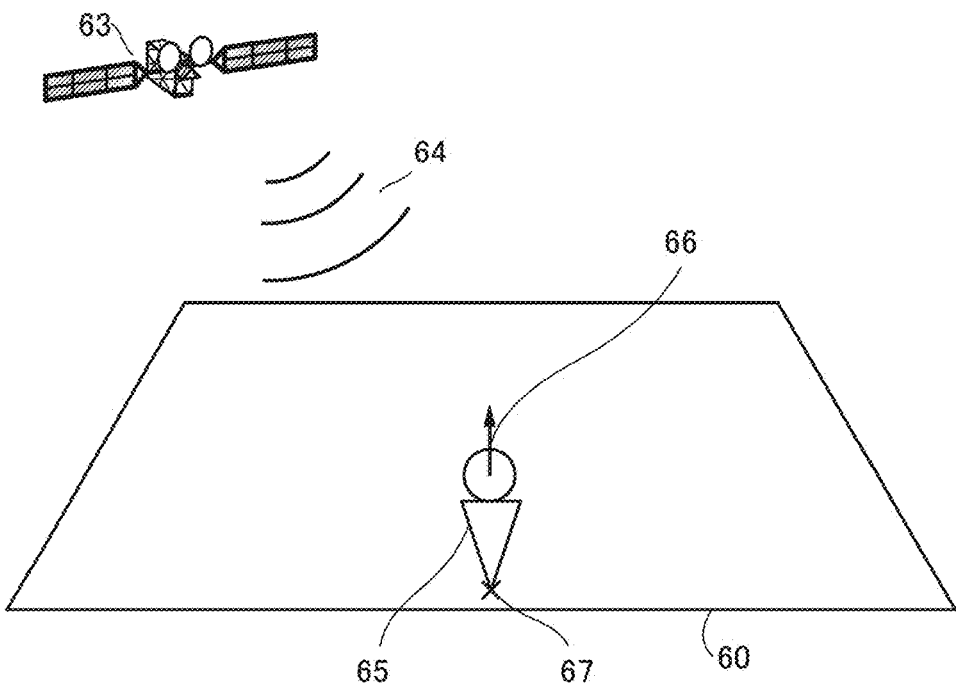
FIGS. 5A to 5C illustrate one embodiment of the present invention.
Figure 5B:
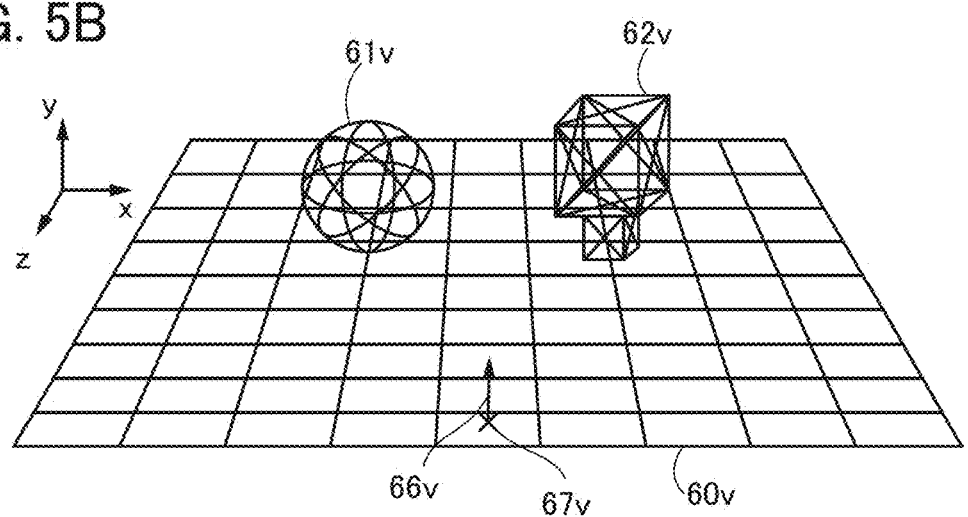

FIG. 5B shows a state where data on position information corresponding to the coordinates 67 and the direction 66 in FIG. 5A is input in FIG. 4B, in which the wire-frame model data is visualized. In other words, FIG. 5B shows coordinates 67v and a direction 66v in the region 60v in a virtual space.

The above-described two-dimensional data generated from the aggregation X correspond to data obtained by projection of the object data 61v and the object data 62v that face the direction 66v on a two-dimensional plane from the coordinates 67v in FIG. 5B. In other words, the two-dimensional data generated from the aggregation X correspond to object data 71v and object data 72v in a two-dimensional region 70v that is defined by the x direction and the y direction as shown in FIG. 5C.

The server 13 transmits data on the position, size, or the like of the object data 71v and the object data 72v based on the two-dimensional data generated from the aggregation X, to the portable terminal 11 through the network 12.

The portable terminal 11 compares the two-dimensional data generated from the aggregation X, that is, the object data 71v and the object data 72v in the region 70v with imaging data obtained by imaging the object 61 and the object 62 positioned in the direction 66 with the portable terminal 11 at the coordinates 67.

A specific example of imaging data obtained by the portable terminal 11 will be described with reference to FIGS. 6A to 6C. As an example, FIG. 6A shows the user 65 positioned at the coordinates 67 in the given real region 60, and the user 65 takes an image of the object 61 and the object 62 with the portable terminal 11 held toward the direction 66.

Figure 6A:
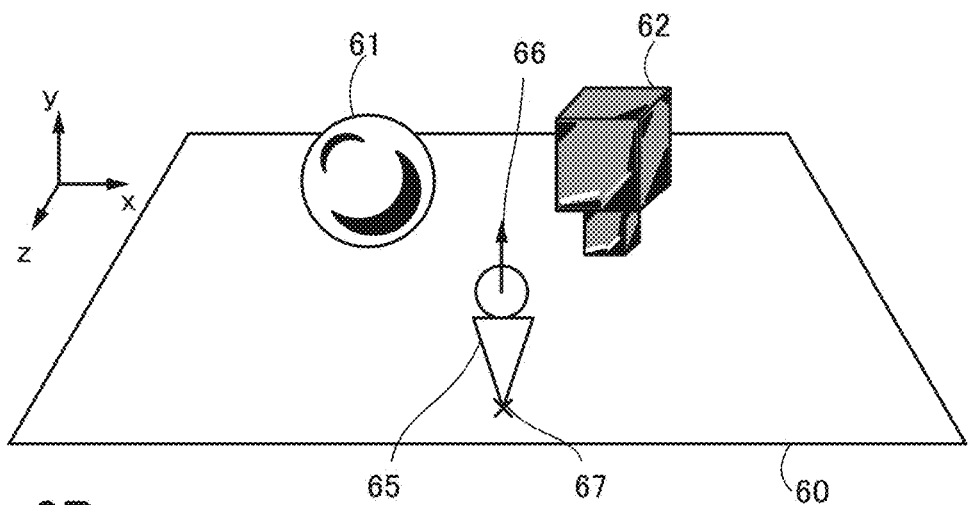
FIGS. 6A to 6C illustrate one embodiment of the present invention.
Figure 6B:
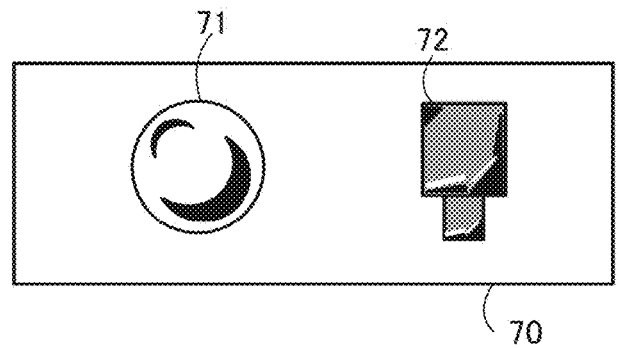
Figure 6C:
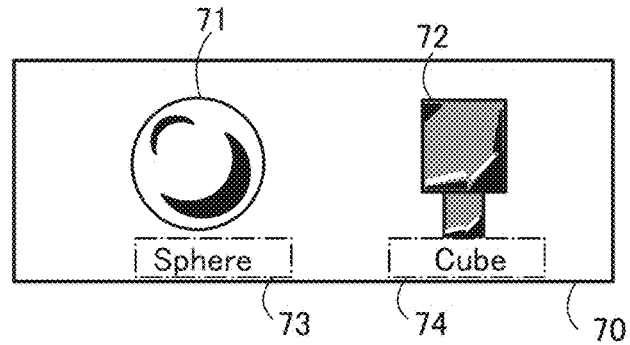

FIG. 6B visualizes imaging data obtained on the basis of the position information in FIG. 6A. In a region 70 that is two-dimensional data in FIG. 6B, object data 71 and object data 72 obtained by imaging are shown.

Figure 5C:
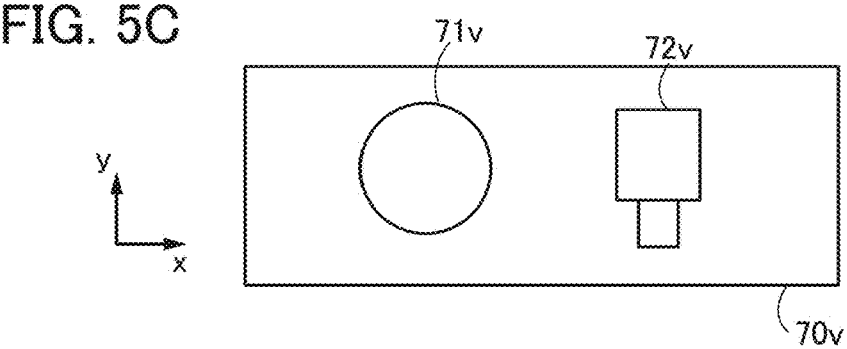

The portable terminal 11 compares the object data 71v and the object data 72v in the two-dimensional region 70v, which are shown in FIG. 5C, with the object data 71 and the object data 72 in the two-dimensional region 70, which are shown in FIG. 6B.

Figure 7A:
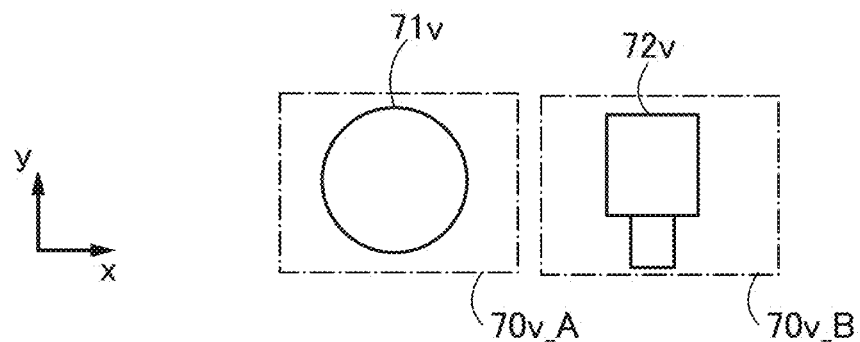
FIGS. 7A to 7C each illustrate one embodiment of the present invention.
Figure 7B:
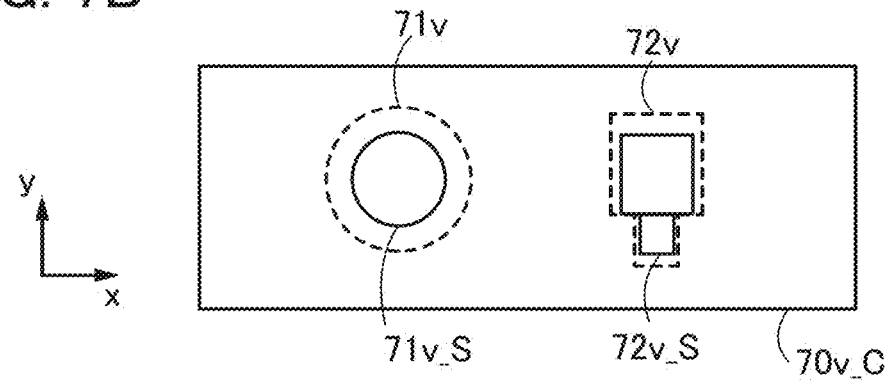
Figure 7C:
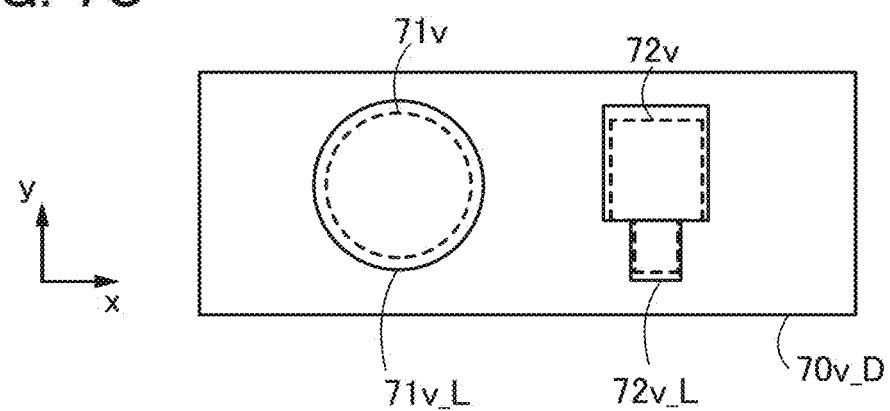

Data comparison can be performed, for example, as shown in FIG. 7A, by cutting a region 70v_A and a region 70v_B that include the object data 71v and the object data 72v, respectively, which are transmitted from the server 13. Alternatively, as illustrated in FIG. 7B, a two-dimensional region 70v_C may be created in which the object data 71v and the object data 72v are converted into reduced object data 71v_S and object data 72v_S to fit in 32×32 pixels, for example. Further alternatively, as illustrated in FIG. 7C, a two-dimensional region 70v_D may be created in which the object data 71v and the object data 72v are converted into expanded object data 71v_L and object data 72v_L to fit in 32×32 pixels, for example.

To compare the two-dimensional data in the region 70v with that in the region 70, a residual sum of squares of grayscale data for pixels is obtained, and it is judged that the data to match when the residual sum of squares is smaller than the threshold value. Alternatively, a sum of the product of grayscale data for pixels is obtained, and it is judged that the data match when the sum is larger than the threshold value.

When it is judged that the two-dimensional data in the region 70v and the two-dimensional data in the region 70 match, related data contained in the object data 61v and the object data 62v, here, data on text information is displayed. In other words, as shown in FIG. 6C, two-dimensional data of the region 70 in which text information 73 is added to the object data 71 obtained by imaging the object 61 and text information 74 is added to the object data 72 obtained by imaging the object 62 is displayed on the portable terminal 11; thus, AR display can be performed. This AR display can be highly convenient because the arithmetic load on the portable terminal 11 side can be small.

A specific example of the case where two-dimensional data in the region 70v and two-dimensional data in the region 70 are judged to mismatch will be described with reference to FIGS. 8A to 8C. As an example, FIG. 8A shows the user 65 positioned at the coordinates 67 in the given real region 60, and the user 65 takes an image of an object 68 with the portable terminal 11 held toward the direction 66.

Figure 8A:
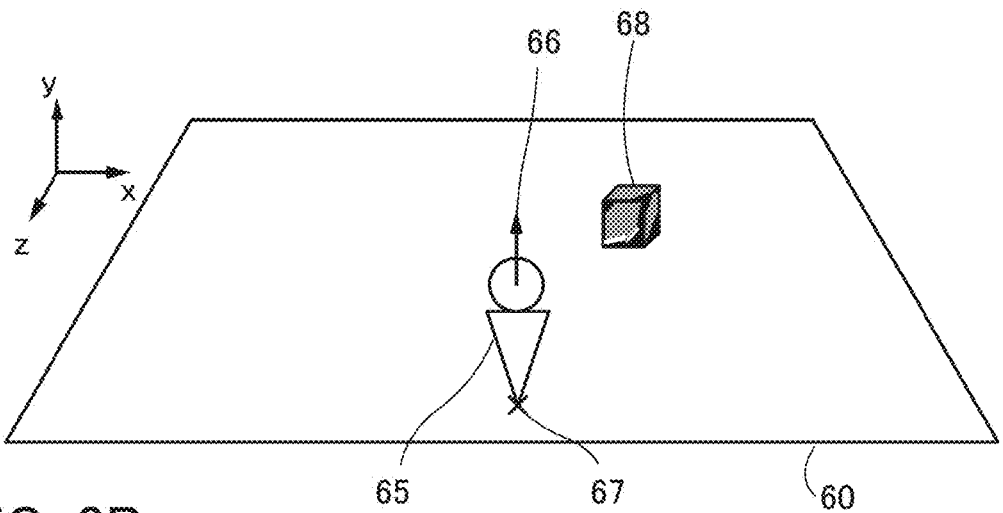
FIGS. 8A to 8C illustrate one embodiment of the present invention.
Figure 8B:
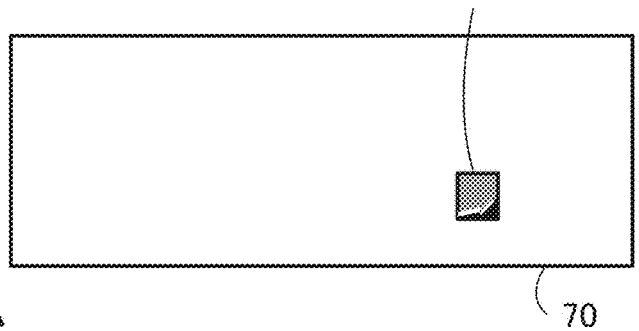

FIG. 8B visualizes imaging data obtained on the basis of the position information in FIG. 8A. In the region 70 that is two-dimensional data in FIG. 8B, object data 76 obtained by imaging is shown. The object data 76 corresponds to the object 68 in FIG. 8A.

The shape of the object 68 according to the object data 76 is different from the shape according to the object data 72. Moreover, object data corresponding to the object data 71 does not exist in the region 70. Accordingly, as visualized in FIG. 8C, the object data 61v in the server 13 is deleted, and the object data 62v is updated to object data 68v. In this case, to update object data, object data recognized by the portable terminal 11 in a mismatch portion is transmitted to the server 13 through the network 12. Thus, it is not necessary to transmit the entire image data; hence, the amount of data traffic can be decreased, and power consumption required for communication can be reduced.

Figure 8C:
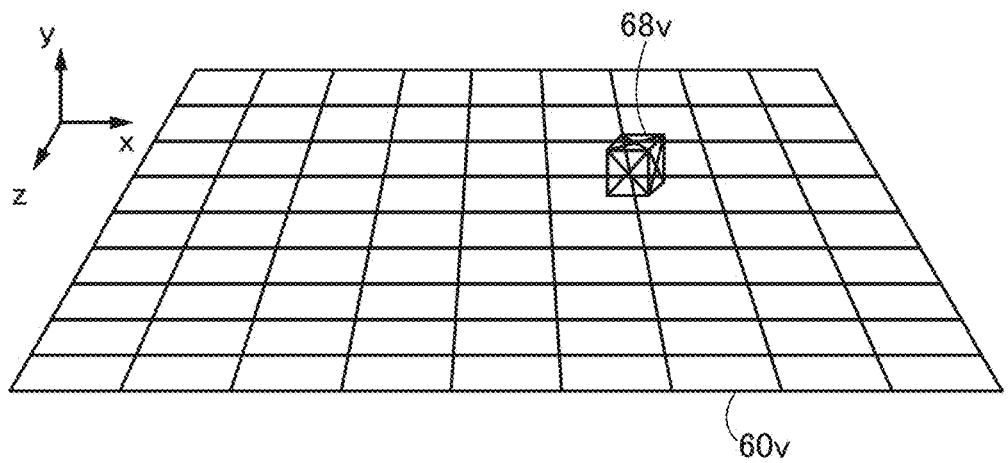

Update of information in a virtual space built in the server 13, which is explained using FIGS. 8A to 8C, can be shared with a plurality of users. Data in an updated virtual space can be updated in response to a frequent change in the positions of real objects; as a result, the convenience of AR display can be increased.

When the portable terminal 11 does not find a matching object or when the battery remaining power is low in the portable terminal 11, the portable terminal 11 may transmit the image and the direction of the object data 76 to the server 13 and whether the data match or not may be determined on the server 13.

A GPS or a gyro sensor used to obtain position information has an accuracy issue. Accordingly, for data comparison, a region to be compared may be vertically and horizontally shifted slightly (e.g., by eight pixels) from a predetermined position of two-dimensional data. When the data at different positions match, position information such as a position and a direction is corrected.

If two-dimensional data is not obtained from the server 13, template matching with a position and a size changed is required for the entire aggregation X, resulting in a large arithmetic load. In contrast, one embodiment of the present invention only needs a smaller number of comparisons; hence, power consumption can be reduced, and delay in display is less likely to occur. In addition, image comparison is not performed in the server 13; thus, a privacy issue is less likely to occur.

Figure 9A:
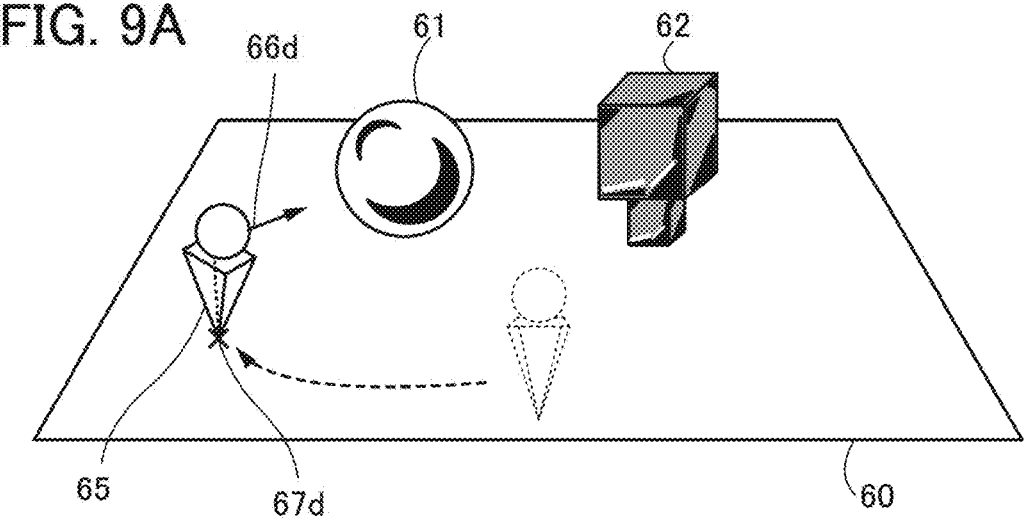
FIGS. 9A to 9C illustrate one embodiment of the present invention.
Figure 9B:
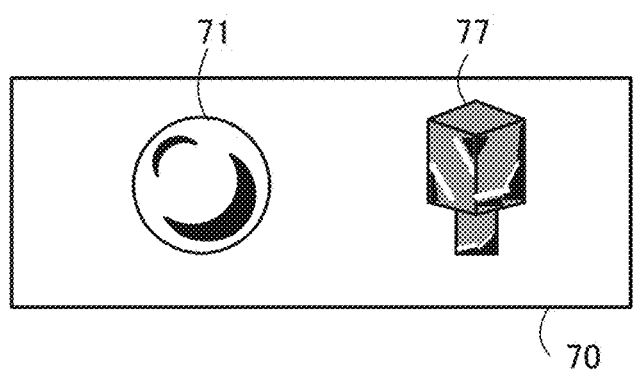
Figure 9C:
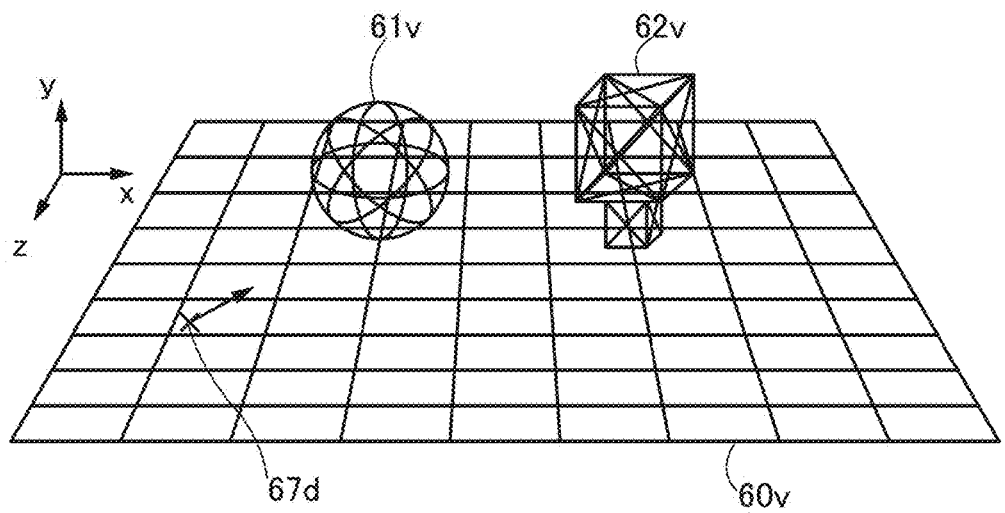

A specific example of correcting shifted position information of the portable terminal 11 will be described with reference to FIGS. 9A to 9C. As an example, FIG. 9A shows the user 65 positioned at coordinates 67d in the given real region 60, and the user 65 holds the portable terminal 11 toward a direction 66d.

Note that the coordinates 67d are slightly shifted from the coordinates 67 shown in FIG. 6A. FIG. 9B illustrates the object data 71 and object data 77 that are obtained by imaging the object 61 and the object 62 positioned in the direction 66d from the coordinates 67d shown in FIG. 9A. Although the object data 71 in the region 70 matches that in FIG. 6B, the object data 77 is slightly different from the object data 72 in FIG. 6B, which means mismatch. That is, the result of data comparison is partial match; some pieces of data match, while others mismatch.

The portable terminal 11 transmit the image and the direction of the object data 77 to the server 13, and coordinates in the region 60 at which the user 65 images the object 62 are obtained on the server 13 on the basis of the object data 61v, the object data 62v, and the object data 77; thus, the portable terminal 11 can specify the coordinates 67d of the user 65 more accurately. Two-dimensional data is created on the server 13 on the basis of the coordinates 67d, and comparison of the two-dimensional data is performed again, resulting in AR display with a more accurate position.

FIG. 3 is a flow chart showing the operations described above. The portable terminal 11 concurrently performs a step 31 of obtaining imaging data, a step 32 of obtaining position information, and a step 33 of obtaining direction information.

In a step 34, the position information and the direction information are transmitted from the portable terminal 11 to the server 13.

In a step 51, the server 13 reads out data from a virtual space in the database 14.

In a step 52, the server 13 generates two-dimensional data on the basis of the three-dimensional data.

In a step 35, the portable terminal 11 compares the two-dimensional data transmitted from the server 13 to the portable terminal 11, the imaging data, and object data. The imaging data is compared to object data on a target and object data on objects around the target.

In a step 36, whether the data compared in the step 35 match, mismatch, or partially match is determined.

When the data match in the step 36, text information is displayed in a step 41.

When the data partially match in the step 36, that is, when object data on a target does not match the imaging data but object data on a peripheral object does, the position information and the direction information are corrected in a step 38. Then, the procedure returns to the step 34, and the corrected position information and direction information are transmitted from the portable terminal 11 to the server 13.

When the data mismatch in the step 36, image data of an imaged region is transmitted from the portable terminal 11 to the server 13 in a step 53 to compare the data in the portable terminal 11 with object data on the server 13.

In a step 54, data in the database is updated on the server 13 on the basis of the image data in the step 53 to build a virtual space.

One embodiment of the present invention is particularly effective when application software cannot be properly used because of an error of several meters, e.g., when application software is used on the move at a speed of several kilometers per hour. For example, when detailed information on an imaged object at a given position is obtained by access to a server, information on the object might not be obtained with inaccurate position information. In one embodiment of the present invention, position information can be corrected through data communication between the server and the portable terminal, and a database can be created on the server; thus, one embodiment of the present invention is particularly effective for application software using a connection between position information and data in a virtual space.

This embodiment can be combined with any of the other embodiments as appropriate.

Embodiment 2

Figure 10:
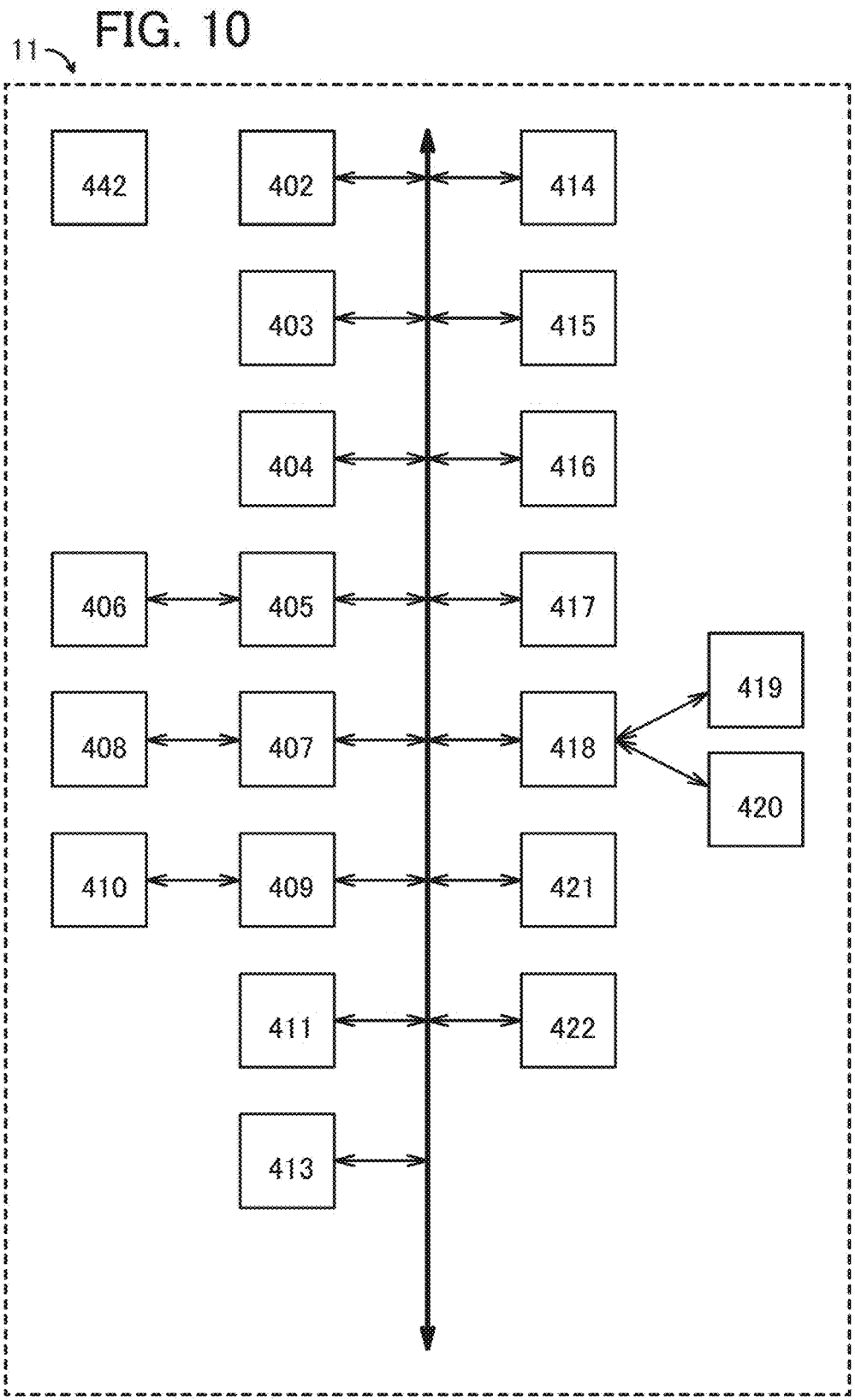
FIG. 10 illustrates a configuration example of a portable terminal.

FIG. 10 is a block diagram showing the configuration of a portable terminal in one embodiment of the present invention. For example, the portable terminal 11 includes a CPU 402, a memory 403, a graphics processing unit (GPU) 404, a display controller 405, a display 406, a touch panel controller 407, a touch panel 408, an image sensor controller 409, an image sensor 410, a communication module 411, a power source 442, an input button 413, a position sensor module 414, a direction sensor 415, a photosensor 416, an external memory device controller 417, an audio codec 418, a speaker 419, a microphone 420, an external video input codec 421, and a general-purpose input/output controller 422. The portable terminal 11 may also include a programmable logic device, an analog arithmetic module, or the like that functions as a coprocessor for the CPU 402 or the GPU 404.

An example of the position sensor module 414 is a GPS for obtaining position information. Examples of the direction sensor 415 include a magnetic field sensor and a gyro sensor.

The display 15 shown in FIG. 1 corresponds to the display 406 in FIG. 10. The position sensor 16 in FIG. 1 corresponds to the position sensor module 414 and the direction sensor 415 in FIG. 10. The arithmetic device 17 in FIG. 1 corresponds to the CPU 402 in FIG. 10. The imaging device 18 in FIG. 1 corresponds to the image sensor 410 in FIG. 10.

Figure 11:
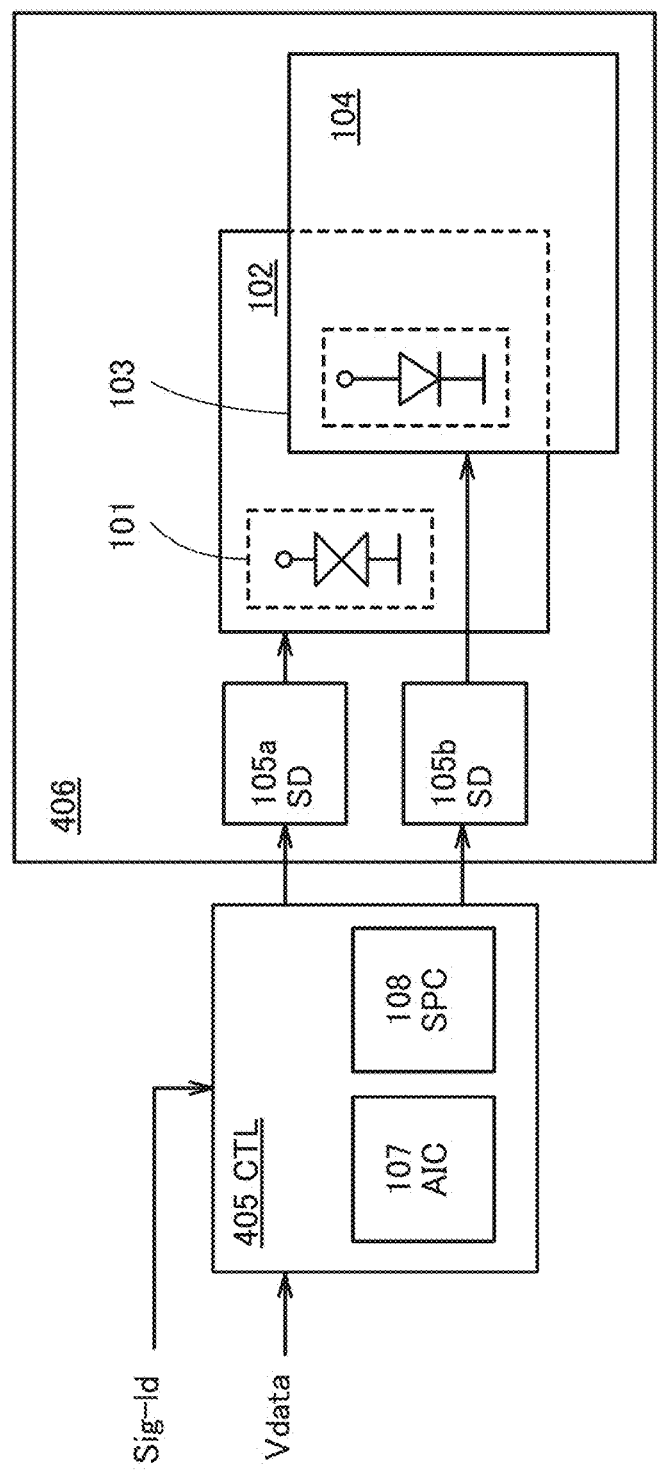
FIG. 11 illustrates a configuration example of a display.

FIG. 11 is a block diagram showing the configuration of the display 406 in FIG. 10. The display 406 in FIG. 11 includes a display portion 102 including a reflective display element 101 such as a liquid crystal element, and a display portion 104 including a light-emitting display element 103 such as an electroluminescent (EL) element. The display portion 102 has a region overlapping with the display portion 104. In the overlap region, light emitted from the light-emitting display element 103 in the display portion 104 passes through the display portion 102. Alternatively, in the overlap region, external light that passes through the display portion 104 enters the display portion 102.

The display 406 in FIG. 11 also includes a driver circuit (SD 105a) with a function of controlling input of an image signal to the display portion 102, and a driver circuit (SD 105b) with a function of controlling input of an image signal to the display portion 104. The gray level of the reflective display element 101 is controlled in accordance with an image signal input to the display portion 102 from the SD 105a. The gray level of the light-emitting display element 103 is controlled in accordance with an image signal input to the display portion 104 from the SD 105b.

Controlling the gray level of the reflective display element 101 enables the display portion 102 to display an image. Controlling the gray level of the light-emitting display element 103 enables the display portion 104 to display an image.

In the display 406 of FIG. 11, an image can be displayed only on the display portion 102 of the two display portions 102 and 104. The display portion 102, which employs the reflective display element 101, can use external light as a light source in displaying an image. In the case of using external light, displaying an image only on the display portion 102 can reduce power consumption of the display 406. In addition, the display portion 104, which employs the light-emitting display element 103, can display an image without additionally preparing a light source or using external light. Accordingly, displaying an image only on the display portion 104 of the two display portions 102 and 104 can increase the display quality even when the intensity of external light is low. That is, the display 406 can have high display quality regardless of the usage environment.

In the display 406 of one embodiment of the present invention, an image can also be displayed using both of the display portions 102 and 104. In this case, the number of gray levels of images that the display 406 can display can be increased. Alternatively, the color gamut of images that the display 406 can display can be widened.

The configuration of the display 406 illustrated in FIG. 11 is preferable particularly when the display 406 is used for the portable terminal described in Embodiment 1, which is capable of showing an augmented image for AR display outdoors, because the effect of improving display quality can be increased.

FIG. 11 also illustrates the display controller 405 (CTL 405) with a function of generating an image signal supplied to the SD 105a and an image signal supplied to the SD 105b from image data Vdata. The CTL 405 also has a function of performing various kinds of correction on the input image data Vdata by signal processing. A function of performing various kinds of correction on the image data Vdata is also referred to as a function of performing various kinds of correction on an image signal Vsiga and an image signal Vsigb. The image signal Vsiga generated by the CTL 405 is supplied to the SD 105a. The image signal Vsigb generated by the CTL 405 is supplied to the SD 105b.

As the correction, it is possible to perform gamma correction suited for the characteristics of the reflective display element 101 and luminance correction suited for degradation characteristics of the light-emitting display element 103, for example. As well as performing the above correction, the display 406 of one embodiment of the present invention can adjust colors and the number of gray levels in accordance with use conditions such as the intensity of external light in the usage environment of the display 406, the incident angle of external light that enters the display 406, or the user's preference.

For the display 406 of one embodiment of the present invention, the CTL 405 includes a signal processing circuit (SPC 108) and an arithmetic circuit (AIC 107). The AIC 107 has a function of calculating parameters for performing adjustment of colors and the number of gray levels on the image signal Vsiga and the image signal Vsigb by using a signal Sig-ld that includes, as information, the use conditions such as the intensity of external light in the usage environment of the display 406, the incident angle of external light that enters the display 406, or the user's preference. The SPC 108 has a function of performing adjustment of colors and the number of gray levels on the image signal Vsiga and the image signal Vsigb by using the parameters calculated by the AIC 107.

Note that information such as the use conditions is often analog data. In this embodiment, the AIC 107 has a function of performing analog arithmetic processing using analog data in a manner similar to analog data processing executed in the brain, in which neurons are basic units. Thus, the AIC 107 can perform arithmetic processing without converting analog data into digital data or with minimum frequencies of converting analog data into digital data. Consequently, it is unnecessary to execute an enormous amount of arithmetic processing, preventing an increase in the size of the arithmetic circuit and an increase in the time required for arithmetic processing. Accordingly, colors and the number of gray levels for image signals can be adjusted in accordance with the use conditions at low power consumption with the CTL 405 having a small circuit size.

This embodiment can be combined with any of the other embodiments as appropriate.

Embodiment 3

This embodiment will show a structure example of a display including a reflective display element and a light-emitting display element described in Embodiment 2. Specifically, this embodiment will show a structure example of a display including a liquid crystal element as the reflective display element and a light-emitting element with an EL material as the light-emitting display element.

Figure 12A:
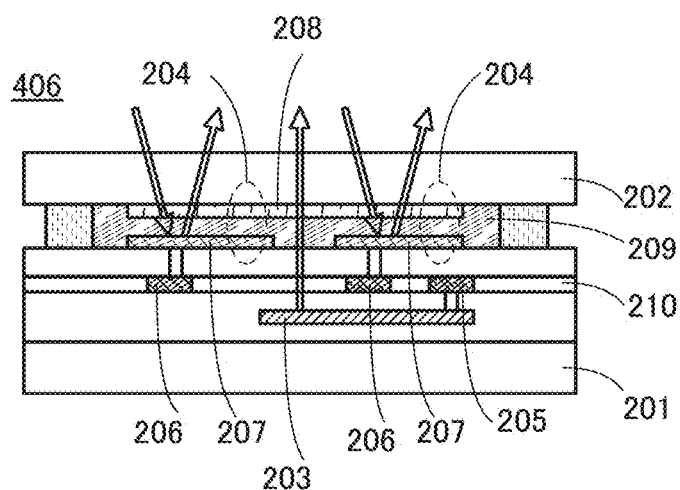
FIGS. 12A to 12C illustrate structure examples of a pixel in a display.

FIG. 12A illustrates an example of a cross-sectional structure of the display 406 in one embodiment of the present invention. The display 406 in FIG. 12A includes a light-emitting element 203, a liquid crystal element 204, a transistor 205 having a function of controlling supply of a current to the light-emitting element 203, and a transistor 206 having a function of controlling supply of a voltage to the liquid crystal element 204. The light-emitting element 203, the liquid crystal element 204, the transistor 205, and the transistor 206 are positioned between a substrate 201 and a substrate 202.

In the display 406, the liquid crystal element 204 includes a pixel electrode 207, a common electrode 208, and a liquid crystal layer 209. The pixel electrode 207 is electrically connected to the transistor 206. The alignment of liquid crystal molecules in the liquid crystal layer 209 is controlled with a voltage applied between the pixel electrode 207 and the common electrode 208. Note that FIG. 12A illustrates an example where the pixel electrode 207 has a function of reflecting visible light and the common electrode 208 has a function of transmitting visible light. Light entering through the substrate 202 is reflected by the pixel electrode 207 and exits through the substrate 202 again, as indicated by white arrows.

The light-emitting element 203 is electrically connected to the transistor 205. The light-emitting element 203 emits light to the substrate 202 side. Since FIG. 12A shows the example where the pixel electrode 207 has a function of reflecting visible light and the common electrode 208 has a function of transmitting visible light, light emitted from the light-emitting element 203 passes through a region that does not overlap with the pixel electrode 207, passes through a region where the common electrode 208 is located, and then exits through the substrate 202, as indicated by a white arrow.

In the display 406 illustrated in FIG. 12A, the transistor 205 and the transistor 206 are located in the same layer 210, and the layer 210 including the transistor 205 and the transistor 206 includes a region positioned between the liquid crystal element 204 and the light-emitting element 203. When at least a semiconductor layer of the transistor 205 and a semiconductor layer of the transistor 206 are located on the same insulating surface, it can be said that the transistor 205 and the transistor 206 are included in the same layer 210.

Owing to the above structure, the transistor 205 and the transistor 206 can be manufactured through a common manufacturing process.

Figure 12B:
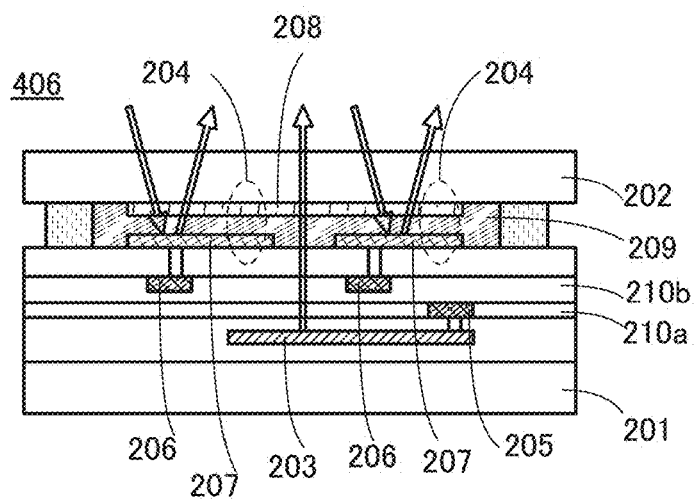

FIG. 12B illustrates another example of a cross-sectional structure of the display 406 in one embodiment of the present invention. The display 406 in FIG. 12B differs from the display 406 in FIG. 12A in that the transistor 205 and the transistor 206 are included in different layers.

Specifically, the display 406 in FIG. 12B includes a layer 210a including the transistor 205 and a layer 210b including the transistor 206, and the layer 210a and the layer 210b each include a region positioned between the liquid crystal element 204 and the light-emitting element 203. In the display 406 illustrated in FIG. 12B, the layer 210a is closer to the light-emitting element 203 than the layer 210b is. When at least a semiconductor layer of the transistor 205 and a semiconductor layer of the transistor 206 are located on different insulating surfaces, it can be said that the transistor 205 and the transistor 206 are included in different layers.

Owing to the above structure, the transistor 205 and a variety of wirings electrically connected to the transistor 205 can partly overlap with the transistor 206 and a variety of wirings electrically connected to the transistor 206. Thus, the size of the pixel can be decreased, and the resolution of the display 406 can be increased.

Figure 12C:
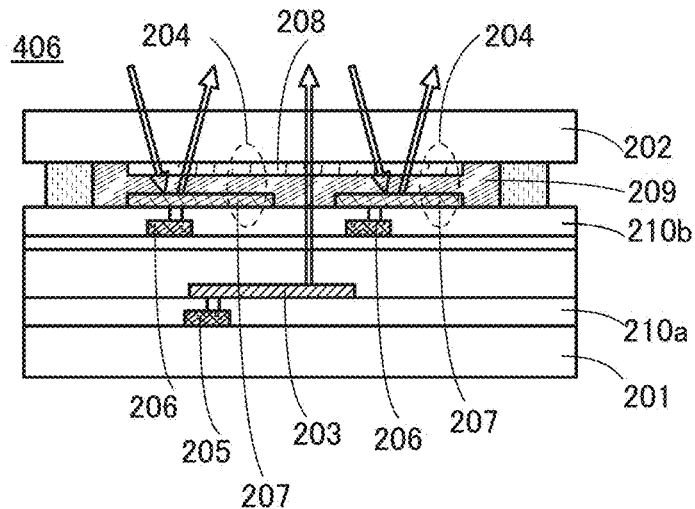

FIG. 12C illustrates another example of a cross-sectional structure of the display 406 in one embodiment of the present invention. The display 406 in FIG. 12C differs from the display 406 in FIG. 12A in that the transistor 205 and the transistor 206 are included in different layers. Moreover, the display 406 in FIG. 12C differs from the display 406 in FIG. 12B in that the layer 210a including the transistor 205 is closer to the substrate 201 than the light-emitting element 203 is.

Specifically, the display 406 in FIG. 12C includes the layer 210a including the transistor 205 and the layer 210b including the transistor 206. The layer 210a includes a region positioned between the light-emitting element 203 and the substrate 201. The layer 210b includes a region positioned between the liquid crystal element 204 and the light-emitting element 203.

Owing to the above structure, the transistor 205 and wirings electrically connected to the transistor 205 can overlap with the transistor 206 and wirings electrically connected to the transistor 206, to a larger extent than in the case of FIG. 12B. Thus, the size of the pixel can be decreased, and the resolution of the display 406 can be increased.

Note that FIGS. 12A to 12C each show the cross-sectional structure in which one light-emitting element 203 is provided with respect to two liquid crystal elements 204. However, the display of one embodiment of the present invention may have a cross-sectional structure in which one light-emitting element 203 is provided with respect to one liquid crystal element 204, or may have a cross-sectional structure in which a plurality of display elements 203 are provided with respect to one liquid crystal element 204.

Although FIGS. 12A to 12C each show the example in which the pixel electrode 207 of the liquid crystal element 204 has a function of reflecting visible light, the pixel electrode 207 may have a function of transmitting visible light. In that case, a light source such as a backlight or a front light may be provided in the display 406, or the light-emitting element 203 may be used as a light source when an image is displayed using the liquid crystal element 204.

This embodiment can be combined with any of the other embodiments as appropriate.

Embodiment 4

This embodiment will show a configuration example of a pixel of a display including a reflective display element and a light-emitting display element. Specifically, this embodiment will show a configuration example of a pixel 300 in one embodiment of the present invention that includes a liquid crystal element as the reflective display element and a light-emitting element with an EL material as the light-emitting display element.

Figure 13A:
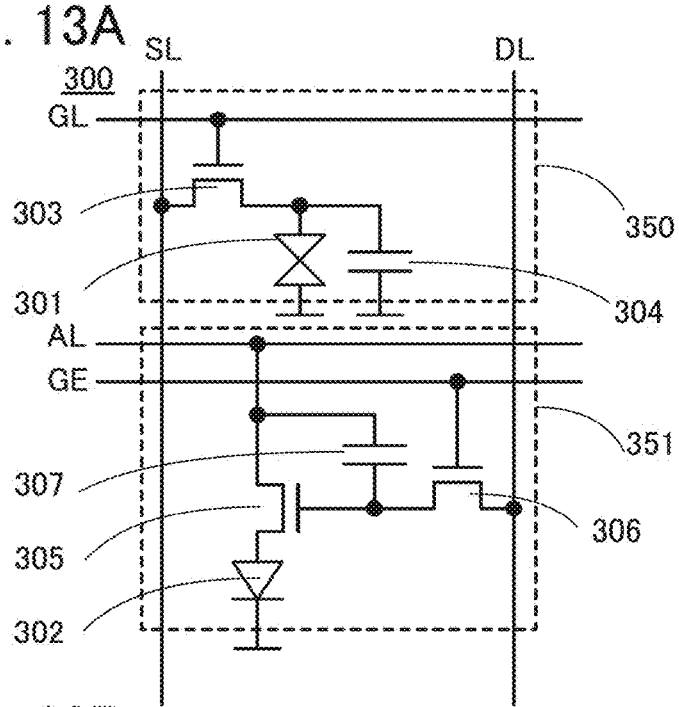
FIGS. 13A and 13B illustrate configuration examples of a pixel in a display.

The pixel 300 illustrated in FIG. 13A includes a pixel 350 and a pixel 351. The pixel 350 includes a liquid crystal element 301, and the pixel 351 includes a light-emitting element 302.

Specifically, the pixel 350 includes the liquid crystal element 301, a transistor 303 having a function of controlling a voltage applied to the liquid crystal element 301, and a capacitor 304. A gate of the transistor 303 is electrically connected to a wiring GL, one of a source and a drain thereof is electrically connected to a wiring SL, and the other of the source and the drain thereof is electrically connected to a pixel electrode of the liquid crystal element 301. A common electrode of the liquid crystal element 301 is electrically connected to a wiring or an electrode to which a predetermined potential is supplied. One electrode of the capacitor 304 is electrically connected to the pixel electrode of the liquid crystal element 301, and the other electrode thereof is electrically connected to a wiring or an electrode to which a predetermined potential is supplied.

Specifically, the pixel 351 includes the light-emitting element 302, a transistor 305 having a function of controlling a current supplied to the light-emitting element 302, a transistor 306 having a function of controlling supply of a potential to a gate of the transistor 305, and a capacitor 307. A gate of the transistor 306 is electrically connected to a wiring GE, one of a source and a drain thereof is electrically connected to a wiring DL, and the other of the source and the drain thereof is electrically connected to the gate of the transistor 305. One of a source and a drain of the transistor 305 is electrically connected to a wiring AL, and the other of the source and the drain thereof is electrically connected to the light-emitting element 302. One electrode of the capacitor 307 is electrically connected to the wiring AL, and the other electrode thereof is electrically connected to the gate of the transistor 305.

In the pixel 300 illustrated in FIG. 13A, an image signal for the liquid crystal element 301 is supplied to the wiring SL and an image signal for the light-emitting element 302 is supplied to the wiring DL, whereby a gray level of an image displayed by the liquid crystal element 301 and a gray level of an image displayed by the light-emitting element 302 can be controlled separately.

Although FIG. 13A illustrates a configuration example of the pixel 300 that includes one pixel 350 with the liquid crystal element 301 and one pixel 351 with the light-emitting element 302, the pixel 300 may include a plurality of pixels 350 or a plurality of pixels 351.

Figure 13B:
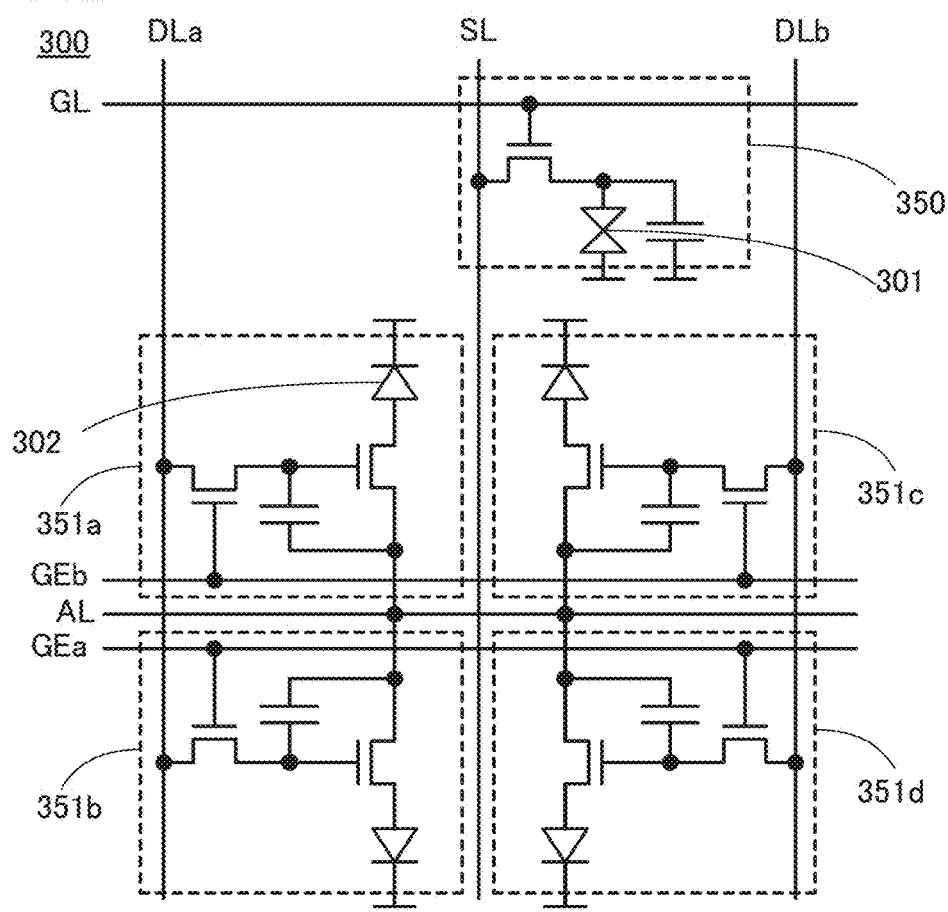

FIG. 13B illustrates a configuration example of the pixel 300 that includes one pixel 350 and four pixels 351.

Specifically, the pixel 300 illustrated in FIG. 13B includes the pixel 350 with the liquid crystal element 301 and pixels 351a to 351d each with the light-emitting element 302.

The configuration of the pixel 350 in FIG. 13A can be referred to for the configuration of the pixel 350 in FIG. 13B.

Like the pixel 351 in FIG. 13A, the pixels 351a to 351d in FIG. 13B each include the light-emitting element 302, the transistor 305 having a function of controlling a current supplied to the light-emitting element 302, the transistor 306 having a function of controlling supply of a potential to the gate of the transistor 305, and the capacitor 307. The light-emitting elements 302 of the pixels 351a to 351d emit light having wavelengths in different ranges; thus, the display can represent a color image.

In the pixels 351a to 351d in FIG. 13B, the gate of the transistor 306 in the pixel 351a and the gate of the transistor 306 in the pixel 351c are electrically connected to a wiring GEb; and the gate of the transistor 306 in the pixel 351b and the gate of the transistor 306 in the pixel 351d are electrically connected to a wiring GEa.

In the pixels 351a to 351d in FIG. 13B, one of the source and the drain of the transistor 306 in the pixel 351a and one of the source and the drain of the transistor 306 in the pixel 351b are electrically connected to a wiring DLa; and one of the source and the drain of the transistor 306 in the pixel 351c and one of the source and the drain of the transistor 306 in the pixel 351d are electrically connected to a wiring DLb.

One of the source and the drain of the transistor 305 in each of the pixels 351a to 351d in FIG. 13B is electrically connected to the wiring AL.

As described above, among the pixels 351a to 351d in FIG. 13B, the pixel 351a and the pixel 351c share the wiring GEb and the pixel 351b and the pixel 351d share the wiring GEa; however, all the pixels 351a to 351d may share one wiring GE. In that case, it is preferred that the pixels 351a to 351d be electrically connected to four respective wirings DL.

Figure 14A:
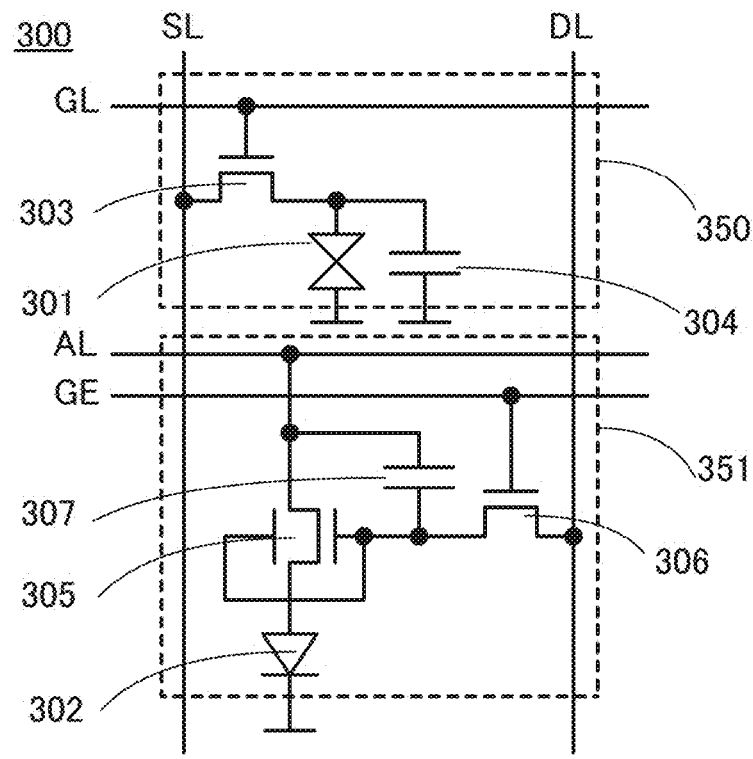
FIGS. 14A and 14B illustrate configuration examples of a pixel in a display.

FIG. 14A illustrates a configuration example of the pixel 300 that is different from that in FIG. 13A. The pixel 300 in FIG. 14A differs from the pixel 300 in FIG. 13A in that the transistor 305 included in the pixel 351 has a back gate.

Specifically, in the pixel 300 illustrated in FIG. 14A, the back gate of the transistor 305 is electrically connected to the gate (front gate) thereof. Owing to this configuration, a shift of the threshold voltage of the transistor 305 can be prevented, which can improve the reliability of the transistor 305 in the pixel 300 in FIG. 14A. Moreover, owing to the above configuration, the size of the transistor 305 can be small and the on-state current of the transistor 305 can be high in the pixel 300 in FIG. 14A.

Note that in the display of one embodiment of the present invention, the pixel 300 may include a plurality of pixels 350 illustrated in FIG. 14A, or may include a plurality of pixels 351 illustrated in FIG. 14A. Specifically, like the pixel 300 in FIG. 13B, the pixel 300 may include one pixel 350 and four pixels 351 illustrated in FIG. 14A. In that case, the pixel 300 in FIG. 13B can be referred to for connections of the wirings and the four pixels 351.

Figure 14B:
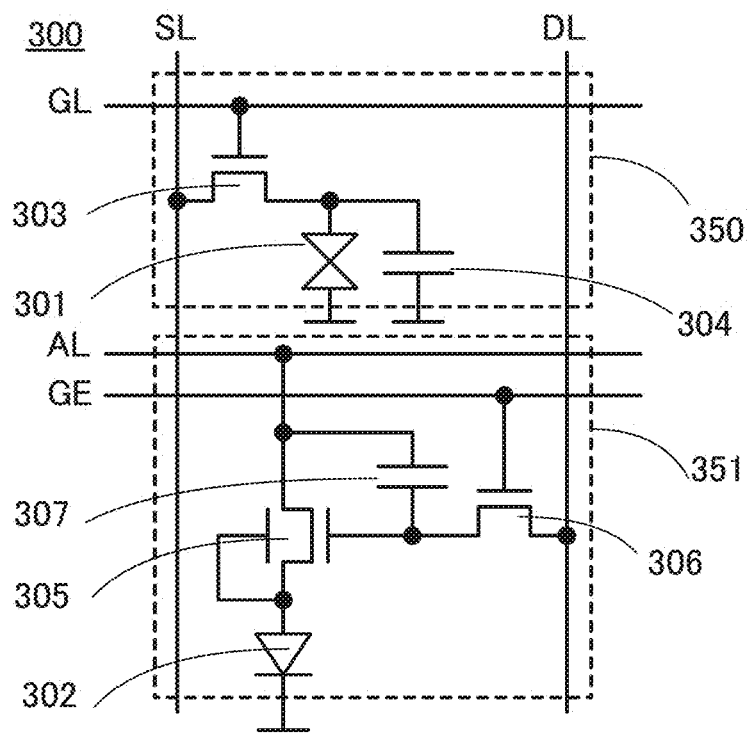

FIG. 14B illustrates a configuration example of the pixel 300 that is different from that in FIG. 13A. The pixel 300 in FIG. 14B differs from the pixel 300 in FIG. 13A in that the transistor 305 included in the pixel 351 has a back gate. In addition, the pixel 300 in FIG. 14B differs from the pixel 300 in FIG. 14A in that the back gate of the transistor 305 is electrically connected to the light-emitting element 302, not to the gate of the transistor 305.

Owing to the above configuration, a shift of the threshold voltage of the transistor 305 can be prevented, which can improve the reliability of the transistor 305 in the pixel 300 in FIG. 14B.

Note that in the display of one embodiment of the present invention, the pixel 300 may include a plurality of pixels 350 illustrated in FIG. 14B, or may include a plurality of pixels 351 illustrated in FIG. 14B. Specifically, like the pixel 300 in FIG. 13B, the pixel 300 may include one pixel 350 and four pixels 351 illustrated in FIG. 14B. In that case, the pixel 300 in FIG. 13B can be referred to for connections of the wirings and the four pixels 351.

Figure 15:
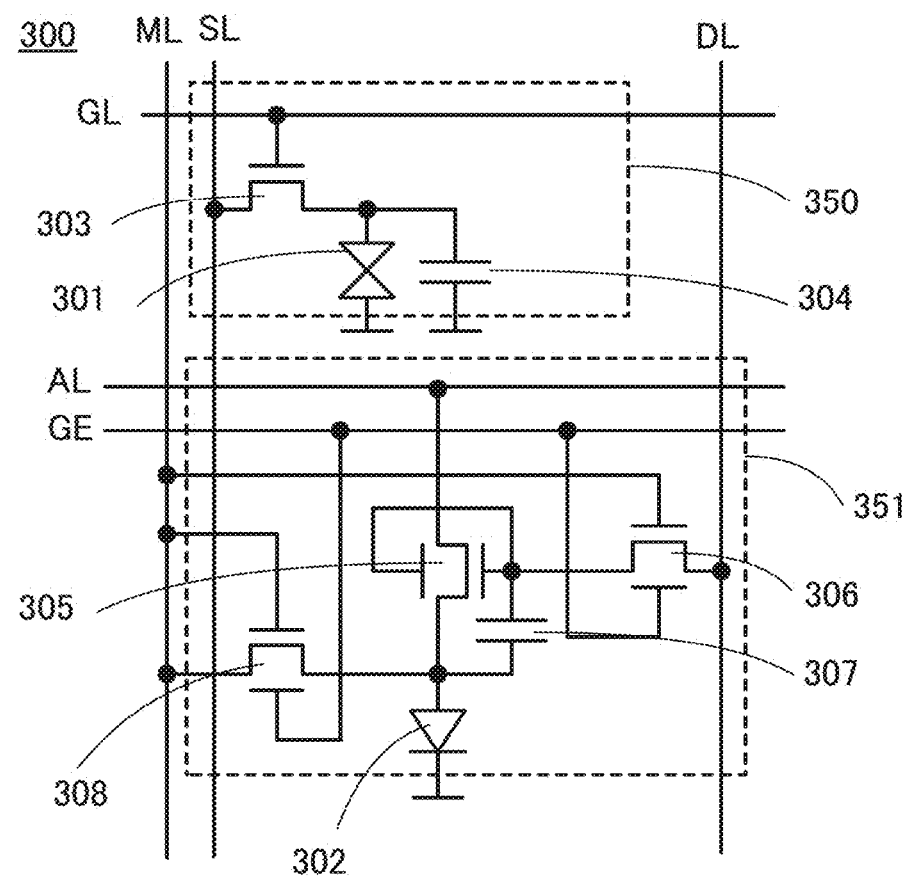
FIG. 15 illustrates a configuration example of a pixel in a display.

FIG. 15 illustrates a configuration example of the pixel 300 that is different from that in FIG. 13A. The pixel 300 illustrated in FIG. 15 includes the pixel 350 and the pixel 351 and is different from that in FIG. 13A in the configuration of the pixel 351.

Specifically, the pixel 351 in FIG. 15 includes the light-emitting element 302, the transistor 305 having a function of controlling a current supplied to the light-emitting element 302, the transistor 306 having a function of controlling supply of a potential to the gate of the transistor 305, a transistor 308 having a function of supplying a predetermined potential to the pixel electrode of the light-emitting element 302, and the capacitor 307. The transistor 305, the transistor 306, and the transistor 308 each have a back gate.

The gate (front gate) of the transistor 306 is electrically connected to a wiring ML, the back gate thereof is electrically connected to the wiring GE, one of the source and the drain thereof is electrically connected to the wiring DL, and the other of the source and the drain thereof is electrically connected to the back gate and the front gate of the transistor 305. One of the source and the drain of the transistor 305 is electrically connected to the wiring AL, and the other of the source and the drain is electrically connected to the light-emitting element 302.

A gate (front gate) of the transistor 308 is electrically connected to the wiring ML, the back gate thereof is electrically connected to the wiring GE, one of a source and a drain thereof is electrically connected to the wiring ML, and the other of the source and the drain thereof is electrically connected to the light-emitting element 302. One electrode of the capacitor 307 is electrically connected to the wiring AL, and the other electrode thereof is electrically connected to the gate of the transistor 305.

Although FIG. 15 illustrates a configuration example of the pixel 300 that includes one pixel 350 with the liquid crystal element 301 and one pixel 351 with the light-emitting element 302, the pixel 300 may include a plurality of pixels 350 or a plurality of pixels 351.

Figure 16:
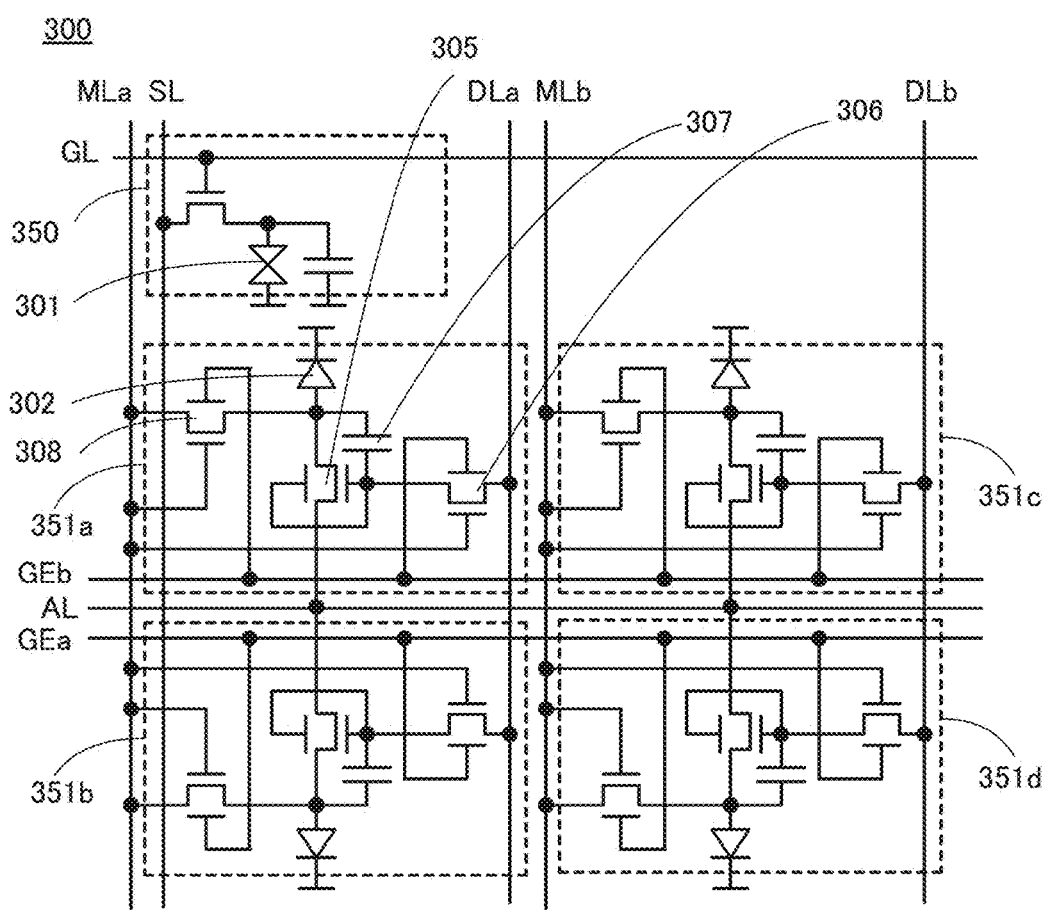
FIG. 16 illustrates a configuration example of a pixel in a display.

FIG. 16 illustrates a configuration example of the pixel 300 that includes one pixel 350 and four pixels 351.

Specifically, the pixel 300 illustrated in FIG. 16 includes the pixel 350 with the liquid crystal element 301 and the pixels 351a to 351d each with the light-emitting element 302.

The configuration of the pixel 350 in FIG. 15 can be referred to for the configuration of the pixel 350 in FIG. 16.

Like the pixel 351 in FIG. 15, the pixels 351a to 351d in FIG. 16 each include the light-emitting element 302, the transistor 305 having a function of controlling a current supplied to the light-emitting element 302, the transistor 306 having a function of controlling supply of a potential to the gate of the transistor 305, the transistor 308 having a function of supplying a predetermined potential to the pixel electrode of the light-emitting element 302, and the capacitor 307. The light-emitting elements 302 of the pixels 351a to 351d emit light having wavelengths in different ranges; thus, the display can represent a color image.

In the pixels 351a to 351d in FIG. 16, the gate of the transistor 306 in the pixel 351a and the gate of the transistor 306 in the pixel 351b are electrically connected to a wiring MLa; and the gate of the transistor 306 in the pixel 351c and the gate of the transistor 306 in the pixel 351d are electrically connected to a wiring MLb.

In the pixels 351a to 351d in FIG. 16, the back gate of the transistor 306 in the pixel 351a and the back gate of the transistor 306 in the pixel 351c are electrically connected to the wiring GEb; and the back gate of the transistor 306 in the pixel 351b and the back gate of the transistor 306 in the pixel 351d are electrically connected to the wiring GEa.

In the pixels 351a to 351d in FIG. 16, one of the source and the drain of the transistor 306 in the pixel 351a and one of the source and the drain of the transistor 306 in the pixel 351b are electrically connected to the wiring DLa; and one of the source and the drain of the transistor 306 in the pixel 351c and one of the source and the drain of the transistor 306 in the pixel 351d are electrically connected to the wiring DLb.

In the pixels 351a to 351d in FIG. 16, the back gate of the transistor 308 in the pixel 351a and the back gate of the transistor 308 in the pixel 351c are electrically connected to the wiring GEb; and the back gate of the transistor 308 in the pixel 351b and the back gate of the transistor 308 in the pixel 351d are electrically connected to the wiring GEa.

In the pixels 351a to 351d in FIG. 16, the gate and one of the source and the drain of the transistor 308 in the pixel 351a are electrically connected to the wiring MLa, and the gate and one of the source and the drain of the transistor 308 in the pixel 351b are electrically connected to the wiring MLa. The gate and one of the source and the drain of the transistor 308 in the pixel 351c are electrically connected to the wiring MLb, and the gate and one of the source and the drain of the transistor 308 in the pixel 351d are electrically connected to the wiring MLb.

One of the source and the drain of the transistor 305 in each of the pixels 351a to 351d in FIG. 16 is electrically connected to the wiring AL.

As described above, among the pixels 351a to 351d in FIG. 16, the pixel 351a and the pixel 351c share the wiring GEb, and the pixel 351b and the pixel 351d share the wiring GEa. However, all the pixels 351a to 351d may share one wiring GE. In that case, it is preferred that the pixels 351a to 351d be electrically connected to four respective wirings DL.

Note that in the case where a transistor with low off-state current is used in the pixel 350 and thus there is no need to rewrite the display screen (i.e., in the case of displaying a still image), a driver circuit can be temporarily stopped (this driving is hereinafter referred to "idling stop driving" or "IDS driving"). By IDS driving, the power consumption of the display 406 can be reduced.

This embodiment can be combined with any of the other embodiments as appropriate.

Embodiment 5

Figure 17:
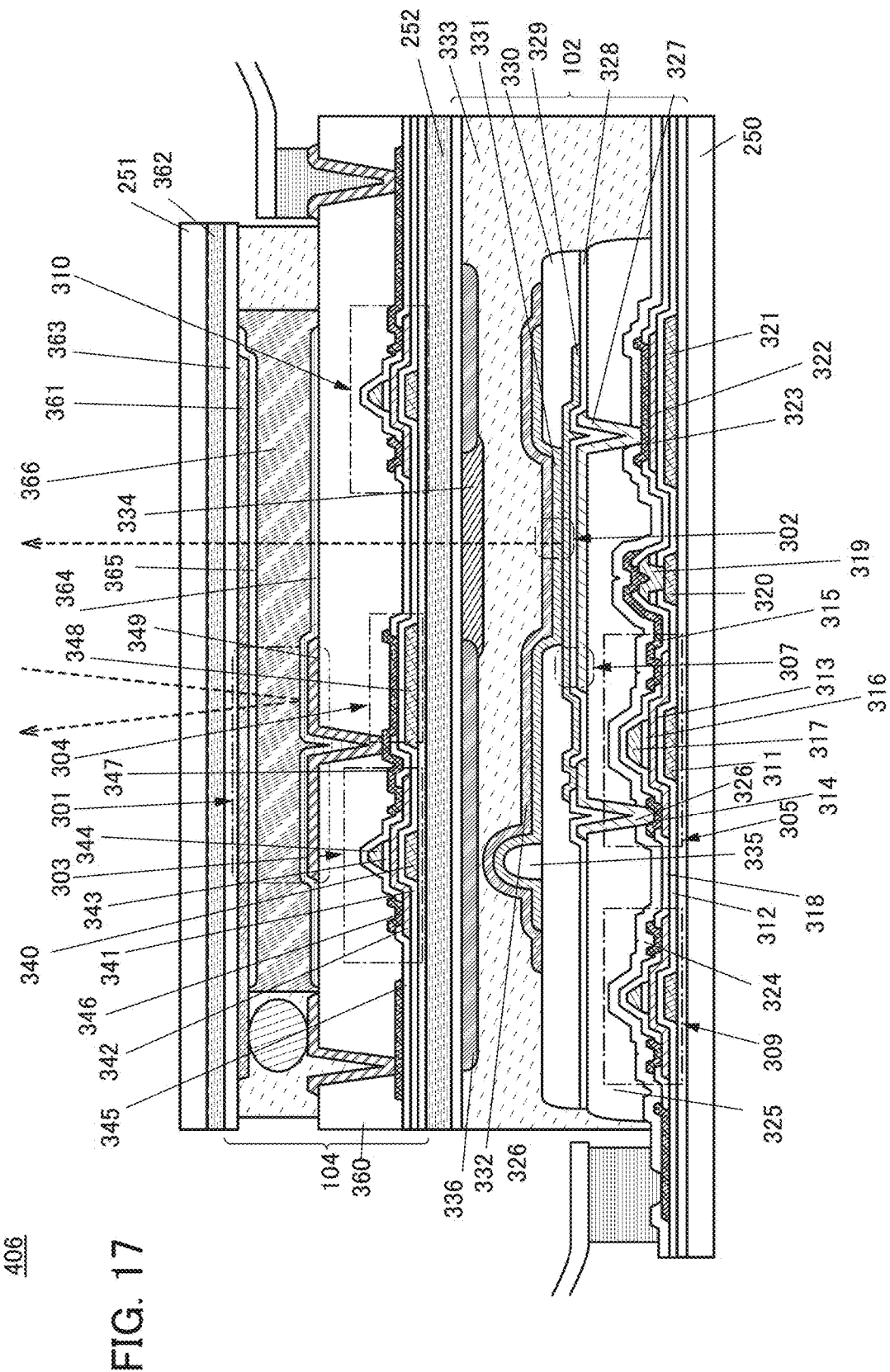
FIG. 17 illustrates an example of a cross-sectional structure of a display.
Figure 18:
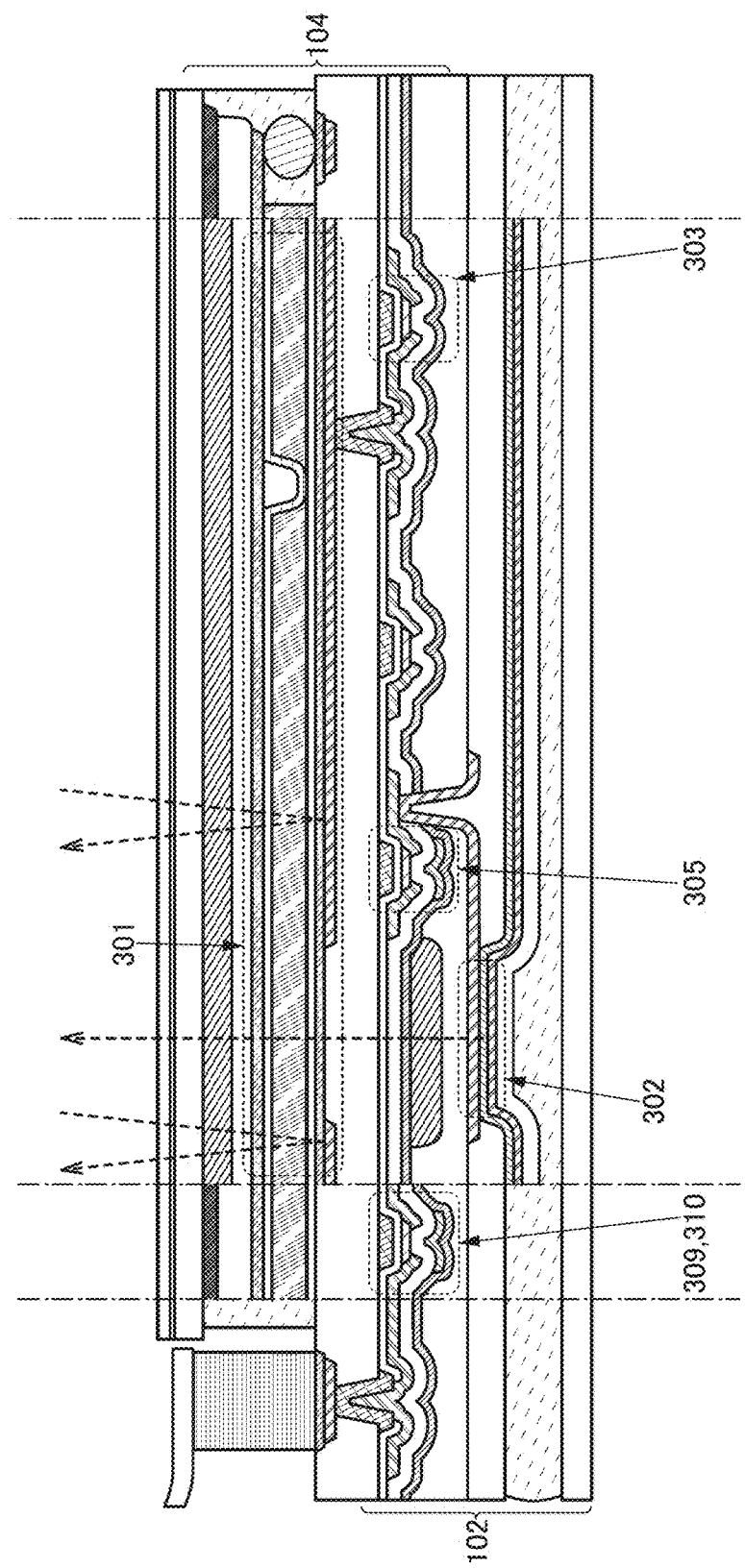
FIG. 18 illustrates an example of a cross-sectional structure of a display.
Figure 19:
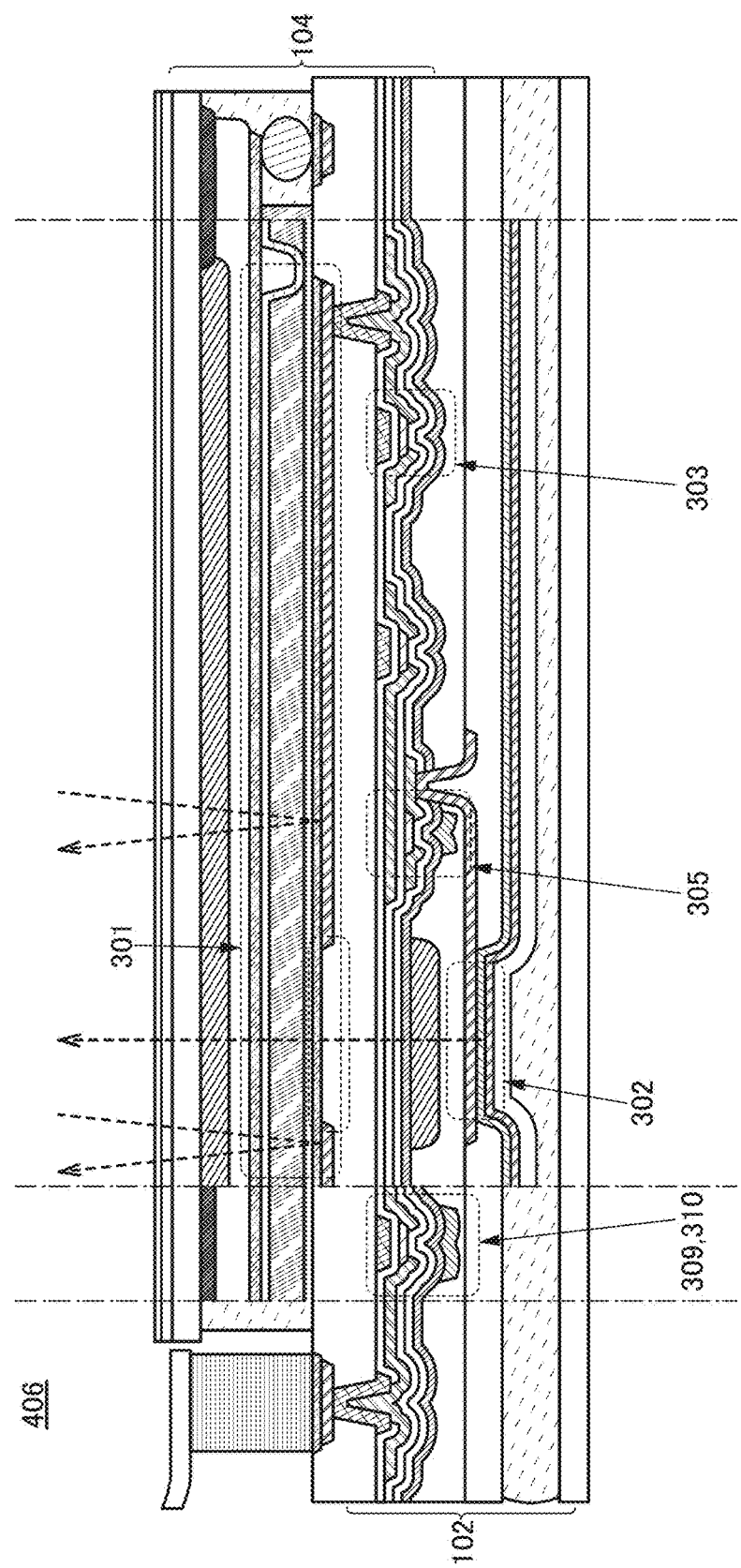
FIG. 19 illustrates an example of a cross-sectional structure of a display.

Referring to FIG. 17, this embodiment will show a specific structure example of the display 406 including a reflective display element and a light-emitting display element, using the display 406 in FIG. 12C as an example. FIG. 18 and FIG. 19 show specific examples of cross-sectional structures of the displays 406 in FIGS. 12A and 12B, each of which includes a reflective display element and a light-emitting display element; however, detailed description thereof is omitted. Note that components that are the same between FIG. 17 and FIGS. 18 and 19 are denoted by the same reference numerals.

FIG. 17 illustrates an example of the cross-sectional structure of the display 406.

The display 406 illustrated in FIG. 17 has a structure in which the display portion 102 and the display portion 104 are stacked between a substrate 250 and a substrate 251. Specifically, the display portions 102 and 104 are bonded to each other with an adhesive layer 252 in FIG. 17.

FIG. 17 illustrates the light-emitting element 302, the transistor 305, and the capacitor 307, which are included in the pixel of the display portion 102, and a transistor 309 included in the driver circuit for the display portion 102. FIG. 17 also illustrates the liquid crystal element 301, the transistor 303, and the capacitor 304, which are included in the pixel of the display portion 104, and a transistor 310 included in the driver circuit for the display portion 104.

The transistor 305 includes a conductive layer 311 serving as the back gate, an insulating layer 312 over the conductive layer 311, a semiconductor layer 313 that is positioned over the insulating layer 312 to overlap with the conductive layer 311, an insulating layer 316 over the semiconductor layer 313, a conductive layer 317 that is positioned over the insulating layer 316 and serves as the gate, and a conductive layer 314 and a conductive layer 315 that are positioned over an insulating layer 318 placed over the conductive layer 317 and are electrically connected to the semiconductor layer 313.

The conductive layer 315 is electrically connected to a conductive layer 319, and the conductive layer 319 is electrically connected to a conductive layer 320. The conductive layer 319 is formed in the same layer as the conductive layer 317. The conductive layer 320 is formed in the same layer as the conductive layer 311.

A conductive layer 321 serving as the back gate of the transistor 306 (not illustrated) is positioned in the same layer as the conductive layers 311 and 320. The insulating layer 312 is positioned over the conductive layer 321, and a semiconductor layer 322 having a region overlapping with the conductive layer 321 is positioned over the insulating layer 312. The semiconductor layer 322 includes a channel formation region of the transistor 306 (not illustrated). The insulating layer 318 is positioned over the semiconductor layer 322, and a conductive layer 323 is positioned over the insulating layer 318. The conductive layer 323 is electrically connected to the semiconductor layer 322 and serves as the source or the drain of the transistor 306 (not illustrated).

The transistor 309 has the same structure as the transistor 305, and therefore, detailed description thereof is omitted.

An insulating layer 324 is positioned over the transistor 305, the conductive layer 323, and the transistor 309. An insulating layer 325 is positioned over the insulating layer 324. A conductive layer 326 and a conductive layer 327 are positioned over the insulating layer 325. The conductive layer 326 is electrically connected to the conductive layer 314. The conductive layer 327 is electrically connected to the conductive layer 323. An insulating layer 328 is positioned over the conductive layers 326 and 327, and a conductive layer 329 is positioned over the insulating layer 328. The conductive layer 329 is electrically connected to the conductive layer 326 and serves as the pixel electrode of the light-emitting element 302.

A region where the conductive layer 327, the insulating layer 328, and the conductive layer 329 overlap with each other serves as the capacitor 307.

An insulating layer 330 is positioned over the conductive layer 329, an EL layer 331 is positioned over the insulating layer 330, and a conductive layer 332 serving as a counter electrode is positioned over the EL layer 331. The conductive layer 329, the EL layer 331, and the conductive layer 332 are electrically connected to each other in an opening of the insulating layer 330. A region where the conductive layer 329, the EL layer 331, and the conductive layer 332 are electrically connected to each other serves as the light-emitting element 302. The light-emitting element 302 has a top-emission structure in which light is emitted in a direction indicated by a dashed arrow from the conductive layer 332 side.

One of the conductive layers 329 and 332 serves as an anode, and the other serves as a cathode. When a voltage higher than the threshold voltage of the light-emitting element 302 is applied between the conductive layer 329 and the conductive layer 332, holes are injected to the EL layer 331 from the anode side and electrons are injected to the EL layer 331 from the cathode side. The injected electrons and holes are recombined in the EL layer 331, and a light-emitting substance contained in the EL layer 331 emits light.

Note that when an oxide semiconductor is used for the semiconductor layers 313 and 322, it is preferred that an insulating material containing oxygen be used for the insulating layer 318 and that a material in which impurities such as water or hydrogen are less likely to diffuse be used for the insulating layer 324 in order to increase the reliability of the display.

When an organic material is used for the insulating layer 325 or the insulating layer 330, if the insulating layer 325 or the insulating layer 330 is exposed at an end portion of the display, impurities such as moisture might enter the light-emitting element 302 or the like from the outside of the display through the insulating layer 325 or the insulating layer 330. The entry of impurities degrades the light-emitting element 302, leading to deterioration of the display. Thus, as illustrated in FIG. 17, it is preferred that neither the insulating layer 325 nor the insulating layer 330 be positioned at the end portion of the display.

The light-emitting element 302 overlaps with a coloring layer 334 with an adhesive layer 333 placed therebetween. A spacer 335 overlaps with a light-blocking layer 336 with the adhesive layer 333 place therebetween. Although FIG. 17 shows there is a space between the conductive layer 332 and the light-blocking layer 336, the conductive layer 332 and the light-blocking layer 336 may be in contact with each other.

The coloring layer 334 is a colored layer that transmits light in a specific wavelength range. For example, a color filter that transmits light in a specific wavelength range, such as red, green, blue, or yellow light, can be used.

Note that one embodiment of the present invention is not limited to a color filter method and may employ a separate coloring method, a color conversion method, a quantum dot method, or the like.

The transistor 303 in the display portion 104 includes a conductive layer 340 serving as the back gate, an insulating layer 341 over the conductive layer 340, a semiconductor layer 342 that is positioned over the insulating layer 341 to overlap with the conductive layer 340, an insulating layer 343 over the semiconductor layer 342, a conductive layer 344 that is positioned over the insulating layer 343 and serves as the gate, and a conductive layer 346 and a conductive layer 347 that are positioned over an insulating layer 345 placed over the conductive layer 344 and are electrically connected to the semiconductor layer 342.

A conductive layer 348 is positioned in the same layer as the conductive layer 340. The insulating layer 341 is positioned over the conductive layer 348. The conductive layer 347 is positioned over the insulating layer 341 and in a region overlapping with the conductive layer 348. A region where the conductive layer 347, the insulating layer 341, and the conductive layer 348 overlap with each other serves as the capacitor 304.

The transistor 310 has the same structure as the transistor 303, and thus, the detailed description is omitted.

An insulating layer 360 is positioned over the transistor 303, the capacitor 304, and the transistor 310. A conductive layer 349 is positioned over the insulating layer 360. The conductive layer 349 is electrically connected to the conductive layer 347 and serves as the pixel electrode of the liquid crystal element 301. An alignment film 364 is positioned over the conductive layer 349.

A conductive layer 361 serving as a common electrode is positioned on the substrate 251. Specifically, in FIG. 17, an insulating layer 363 is bonded to the substrate 251 with an adhesive layer 362 placed therebetween, and the conductive layer 361 is positioned on the insulating layer 363. An alignment film 365 is positioned on the conductive layer 361, and a liquid crystal layer 366 is positioned between the alignment film 364 and the alignment film 365.

In FIG. 17, the conductive layer 349 has a function of reflecting visible light, and the conductive layer 361 has a function of transmitting visible light. Thus, light entering from the substrate 251 side can be reflected by the conductive layer 349 and emitted to the substrate 251 side, as indicated by a dashed arrow.

A conductive material that transmits visible light is preferably a material containing one of indium (In), zinc (Zn), and tin (Sn), for example. Specific examples include indium oxide, indium tin oxide (ITO), indium zinc oxide, indium oxide containing tungsten oxide, indium zinc oxide containing tungsten oxide, indium oxide containing titanium oxide, indium tin oxide containing titanium oxide, indium tin oxide containing silicon oxide (ITSO), zinc oxide, and zinc oxide containing gallium. Note that a film containing graphene can be used as well. The film containing graphene can be formed, for example, by reducing a film containing graphene oxide.

Examples of a conductive material that reflects visible light include aluminum, silver, and an alloy containing any of these metal materials. Other examples are a metal material such as gold, platinum, nickel, tungsten, chromium, molybdenum, iron, cobalt, copper, or palladium and an alloy containing any of these metal materials. Furthermore, lanthanum, neodymium, germanium, or the like may be added to the metal material or the alloy. It is also possible to use an alloy containing aluminum (an aluminum alloy), such as an alloy of aluminum and titanium, an alloy of aluminum and nickel, an alloy of aluminum and neodymium, or an alloy of aluminum, nickel, and lanthanum (Al—Ni—La); or an alloy containing silver, such as an alloy of silver and copper, an alloy of silver, palladium, and copper (also referred to as Ag—Pd—Cu or APC), or an alloy of silver and magnesium.

Although FIG. 17 shows the structure of the display including a top-gate transistor having a back gate, the display of one embodiment of the present invention may include a transistor without a back gate or a bottom-gate transistor.

There is no particular limitation on the crystallinity of a semiconductor material used for the transistor, and an amorphous semiconductor or a semiconductor having crystallinity (a microcrystalline semiconductor, a polycrystalline semiconductor, a single crystal semiconductor, or a semiconductor partly including crystal regions) can be used. A semiconductor having crystallinity is preferably used, in which case deterioration of the transistor characteristics can be suppressed.

As the semiconductor material used for the transistor, an oxide semiconductor can be used. A typical example is an oxide semiconductor containing indium.

In particular, a semiconductor material having a wider bandgap and a lower carrier density than silicon is preferably used because the off-state current of the transistor can be reduced.

The semiconductor layer preferably includes, for example, a film of an In-M-Zn-based oxide that contains at least indium, zinc, and M (a metal such as aluminum, titanium, gallium, germanium, yttrium, zirconium, lanthanum, cerium, tin, neodymium, or hafnium). In order to reduce variations in electrical characteristics of the transistor including the oxide semiconductor, the oxide semiconductor preferably contains a stabilizer in addition to In, Zn, and M.

Examples of the stabilizer are the metals applicable to M (e.g., gallium, tin, hafnium, aluminum, and zirconium).

Other examples of the stabilizer are lanthanoid such as lanthanum, cerium, praseodymium, neodymium, samarium, europium, gadolinium, terbium, dysprosium, holmium, erbium, thulium, ytterbium, and lutetium.

As an oxide semiconductor included in the semiconductor layer, any of the following can be used, for example: In—Ga—Zn-based oxide, In—Al—Zn-based oxide, In—Sn—Zn-based oxide, In—Hf—Zn-based oxide, In—La—Zn-based oxide, In—Ce—Zn-based oxide, In—Pr—Zn-based oxide, In—Nd—Zn-based oxide, In—Sm—Zn-based oxide, In—Eu—Zn-based oxide, In—Gd—Zn-based oxide, In—Tb—Zn-based oxide, In—Dy—Zn-based oxide, In—Ho—Zn-based oxide, In—Er—Zn-based oxide, In—Tm—Zn-based oxide, In—Yb—Zn-based oxide, In—Lu—Zn-based oxide, In—Sn—Ga—Zn-based oxide, In—Hf—Ga—Zn-based oxide, In—Al—Ga—Zn-based oxide, In—Sn—Al—Zn-based oxide, In—Sn—Hf—Zn-based oxide, and In—Hf—Al—Zn-based oxide.

Note that here, an In—Ga—Zn-based oxide means an oxide containing In, Ga, and Zn as its main components, and there is no limitation on the ratio of In:Ga:Zn. The In—Ga—Zn-based oxide may contain another metal element in addition to In, Ga, and Zn.

Although this embodiment exemplifies the structure of the display in which a liquid crystal element is used as a reflective display element, the reflective display element can also be a shutter-type microelectromechanical systems (MEMS) element, an optical-interference-type MEMS element, an element employing a microcapsule method, an electrophoretic element, an electrowetting element, or electronic liquid powder (registered trademark).

As a light-emitting display element, a self-luminous light-emitting element such as an organic light-emitting diode (OLED), a light-emitting diode (LED), or a quantum-dot light-emitting diode (QLED) can be used.

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes. Other than the VA mode, the liquid crystal element can employ, for example, a twisted nematic (TN) mode, an in-plane switching (IPS) mode, a fringe field switching (FFS) mode, an axially symmetric aligned micro-cell (ASM) mode, an optically compensated birefringence (OCB) mode, a ferroelectric liquid crystal (FLC) mode, or an antiferroelectric liquid crystal (AFLC) mode.

The liquid crystal used for the liquid crystal element can be thermotropic liquid crystal, low-molecular liquid crystal, high-molecular liquid crystal, polymer dispersed liquid crystal (PDLC), ferroelectric liquid crystal, anti-ferroelectric liquid crystal, or the like. Such a liquid crystal material exhibits a cholesteric phase, a smectic phase, a cubic phase, a chiral nematic phase, an isotropic phase, or the like depending on conditions.

As the liquid crystal material, either positive liquid crystal or negative liquid crystal can be used; an appropriate liquid crystal material needs to be selected depending on the mode or design to be used.

An alignment film can be provided to adjust the alignment of liquid crystal. When a horizontal electric field mode is employed, liquid crystal exhibiting a blue phase for which an alignment film is unnecessary may be used. A blue phase is one of liquid crystal phases, which is generated just before a cholesteric phase changes into an isotropic phase while the temperature of cholesteric liquid crystal is increased. Since a blue phase appears only in a narrow temperature range, a liquid crystal composition in which several weight percent or more of a chiral material is mixed is used for the liquid crystal layer in order to widen the temperature range. A liquid crystal composition that includes liquid crystal exhibiting a blue phase and a chiral material has a short response time and optical isotropy, which makes the alignment process unneeded. Moreover, such a liquid crystal composition has a small viewing angle dependence. An alignment film does not need to be provided and rubbing treatment is thus not necessary; hence, electrostatic discharge damage caused by the rubbing treatment can be prevented, and defects and damage of a liquid crystal display in the manufacturing process can be reduced.

This embodiment can be combined with any of the other embodiments as appropriate.

Embodiment 6

Figure 20A:
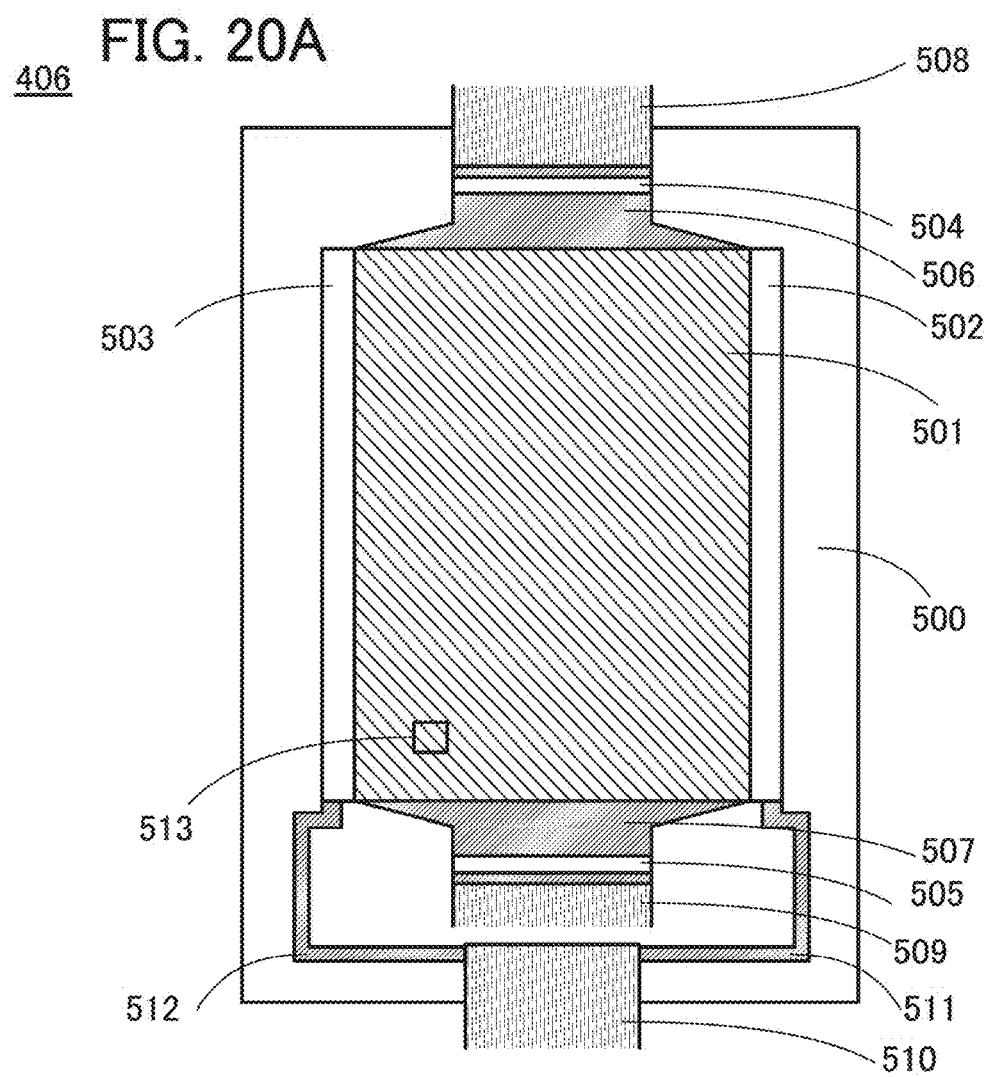
FIGS. 20A and 20B illustrate an example of the appearance of a display.

FIG. 20A illustrates an example of the appearance of the display 406 in one embodiment of the present invention. The display 406 in FIG. 20A includes, over a substrate 500, a pixel portion 501, a scan line driver circuit 502 for pixels including reflective display elements, and a scan line driver circuit 503 for pixels including light-emitting display elements. An IC 504 includes a signal line driver circuit for the pixels including reflective display elements, and is electrically connected to the pixel portion 501 through a wiring 506. An IC 505 includes a signal line driver circuit for the pixels including light-emitting display elements, and is electrically connected to the pixel portion 501 through a wiring 507.

An FPC 508 is electrically connected to the IC 504, and an FPC 509 is electrically connected to the IC 505. An FPC 510 is electrically connected to the scan line driver circuit 502 through a wiring 511. The FPC 510 is also electrically connected to the scan line driver circuit 503 through a wiring 512.

Figure 20B:
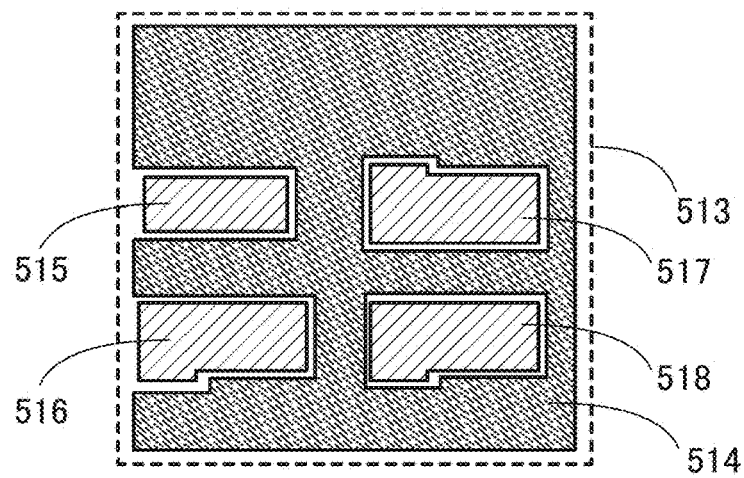

Using an example where the reflective display element is a liquid crystal element and the light-emitting display element is a light-emitting element, FIG. 20B illustrates a layout of a display region of a liquid crystal element and display regions of light-emitting elements in a pixel 513 included in the pixel portion 501.

Specifically, the pixel 513 in FIG. 20B includes a display region 514 of the liquid crystal element, a display region 515 of a light-emitting element corresponding to yellow, a display region 516 of a light-emitting element corresponding to green, a display region 517 of a light-emitting element corresponding to red, and a display region 518 of a light-emitting element corresponding to blue.

Note that in order to display black with high color reproducibility by using the light-emitting elements corresponding to green, blue, red, and yellow, the amount of current flowing to the light-emitting element corresponding to yellow per unit area needs to be the smallest among those flowing to the light-emitting elements. In FIG. 20B, the display region 516 of the light-emitting element corresponding to green, the display region 517 of the light-emitting element corresponding to red, and the display region 518 of the light-emitting element corresponding to blue have substantially the same area, and the display region 515 of the light-emitting element corresponding to yellow has a slightly smaller area than the other display regions. Thus, black can be displayed with high color reproducibility.

This embodiment can be combined with any of the other embodiments as appropriate.

Embodiment 7

In this embodiment, examples of electronic devices that use the display of one embodiment of the present invention will be described.

Figure 21A:
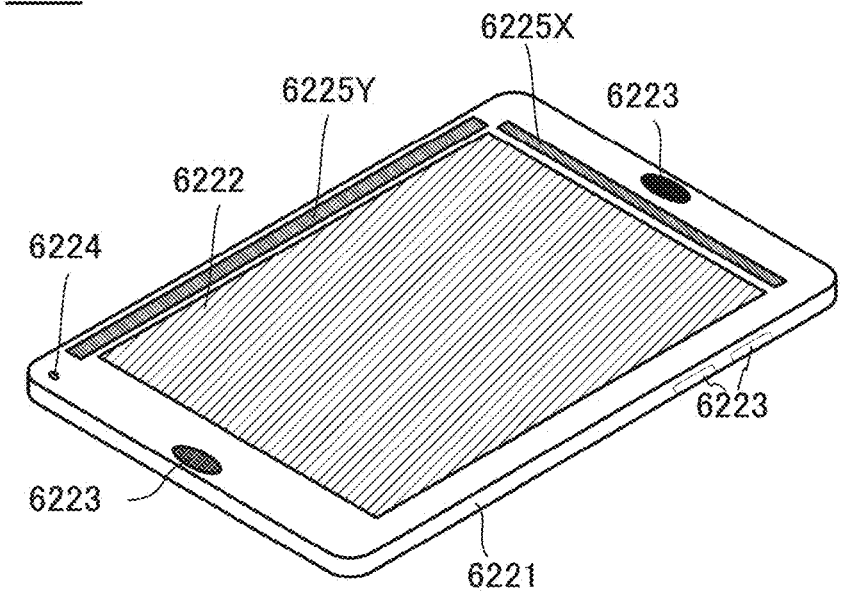
FIGS. 21A and 21B illustrate examples of electronic devices.

FIG. 21A illustrates a tablet portable terminal 6200 that includes a housing 6221, a display 6222, operation buttons 6223, and a speaker 6224. A position input function may be added to the display 6222 of one embodiment of the present invention. Note that the position input function can be added by provision of a touch panel in the display. Alternatively, the position input function can be added by provision of a photoelectric conversion element called a photosensor in a pixel portion of the display. As the operation buttons 6223, any of a power switch for starting the portable terminal 6200, a button for operating an application of the portable terminal 6200, a volume control button, a switch for turning on or off the display 6222, and the like can be provided. Although the number of the operation buttons 6223 is four in the portable terminal 6200 in FIG. 21A, the number and position of operation buttons included in the portable terminal 6200 is not limited to this example.

Moreover, the portable terminal 6200 includes a photosensor 6225X and a photosensor 6225Y that measure the illuminance of external light. The photosensor 6225X and the photosensor 6225Y are located on a bezel of the housing 6221. Specifically, the photosensor 6225X is located along one of two short sides of the bezel of the housing 6221, and the photosensor 6225Y is located along one of two long sides of the bezel of the housing 6221. In one embodiment of the present invention, the illuminance of external light is measured by the photosensors 6225X and 6225Y, and adjustment such as switching of the display element that is to perform display in the display 6222 can be performed on the basis of the measured data.

Figure 21B:
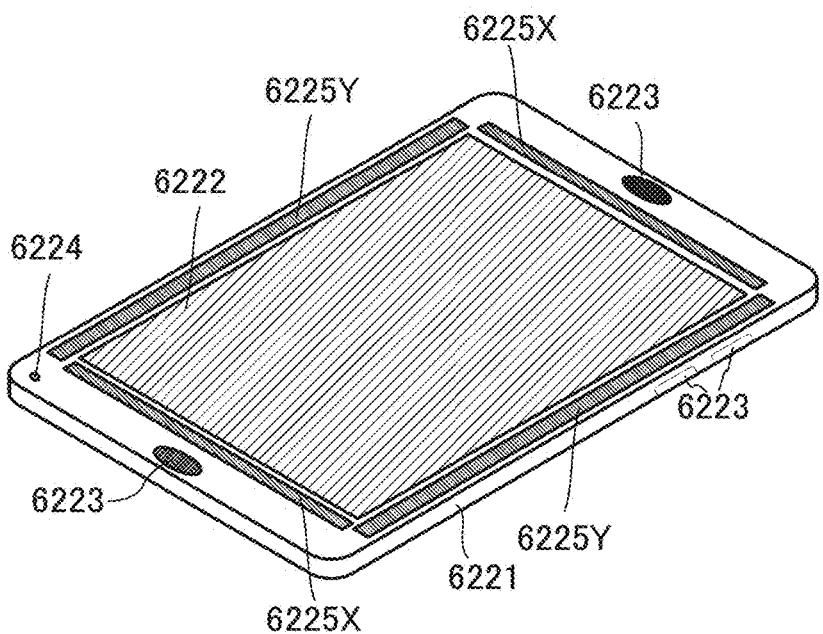

The locations of the photosensors 6225X and 6225Y are not limited to those in the portable terminal 6200 in FIG. 21A. For example, as in a portable terminal 6201 illustrated in FIG. 21B, photosensors 6225X may be provided for both of the two short sides of the bezel of the housing 6221, and photosensors 6225Y may be provided for both of the two long sides of the bezel of the housing 6221.

Although not illustrated, the portable terminal 6200 in FIG. 21A may include a sensor (that measures force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, smell, infrared rays, or the like) inside the housing 6221. In particular, when a measuring device that includes a sensor for measuring inclination (e.g., a gyroscope sensor or an acceleration sensor) is provided, display on the screen of the display 6222 can be automatically changed in accordance with the orientation of the portable terminal 6200 in FIG. 21A by determining the orientation of the information terminal 6200 (the orientation of the portable terminal with respect to the vertical direction).

This embodiment can be combined with any of the other embodiments as appropriate.

Embodiment 8

FIGS. 22A to 22F illustrate specific examples of electronic devices that can be applied to a portable terminal including the display of one embodiment of the present invention.

FIG. 22A illustrates a portable game machine including a housing 5001, a housing 5002, a display 5003 of one embodiment of the present invention, a display 5004 of one embodiment of the present invention, a microphone 5005, speakers 5006, operation keys 5007, a stylus 5008, and the like. Although the portable game machine in FIG. 22A has the two displays 5003 and 5004, the number of displays included in the portable game machine is not limited to two. The use of the display 5003 and the display 5004 of one embodiment of the present invention enables high-quality images to be displayed regardless of the intensity of external light in the usage environment of the portable game machine and achieves low power consumption.

FIG. 22B illustrates a wristwatch-type mobile terminal including a housing 5201, a display 5202 of one embodiment of the present invention, a band 5203, a photosensor 5204, a switch 5205, and the like. The use of the display 5202 of one embodiment of the present invention enables high-quality images to be displayed regardless of the intensity of external light in the usage environment of the wristwatch-type mobile terminal and achieves low power consumption.

FIG. 22C illustrates a tablet personal computer including a housing 5301, a housing 5302, a display 5303 of one embodiment of the present invention, a photosensor 5304, a photosensor 5305, a switch 5306, and the like. The display 5303 is supported by the housing 5301 and the housing 5302. The display 5303 is formed using a flexible substrate and thus has is flexible in shape and bendable. By changing the angle between the housing 5301 and the housing 5302 with a hinge 5307 and a hinge 5308, the display 5303 can be folded so that the housing 5301 and the housing 5302 overlap with each other. Although not illustrated, an open/close sensor may be incorporated so that the change in the above angle can be used as information about the usage conditions of the display 5303. The use of the display 5303 of one embodiment of the present invention enables high-quality images to be displayed regardless of the intensity of external light in the usage environment of the tablet personal computer and achieves low power consumption.

FIG. 22D illustrates a video camera including a housing 5801, a housing 5802, a display 5803 of one embodiment of the present invention, operation keys 5804, a lens 5805, a joint 5806, and the like. The operation keys 5804 and the lens 5805 are provided in the housing 5801, and the display 5803 is provided in the housing 5802. The housing 5801 and the housing 5802 are connected to each other with the joint 5806, and the angle between the housing 5801 and the housing 5802 can be changed with the joint 5806. An image on the display 5803 may be switched depending on the angle between the housing 5801 and the housing 5802 at the joint 5806. The use of the display 5803 of one embodiment of the present invention enables high-quality images to be displayed regardless of the intensity of external light in the usage environment of the video camera and achieves low power consumption.

FIG. 22E illustrates a wristwatch-type mobile terminal including a housing 5701 with a curved surface, a display 5702 of one embodiment of the present invention, and the like. When a flexible substrate is used for the display 5702 of one embodiment of the present invention, the display 5702 can be supported by the housing 5701 having a curved surface. It is thus possible to provide a user-friendly wristwatch-type portable terminal that is flexible and lightweight. The use of the display 5702 of one embodiment of the present invention enables high-quality images to be displayed regardless of the intensity of external light in the usage environment of the wristwatch-type mobile terminal and achieves low power consumption.

FIG. 22F illustrates a mobile phone. In the mobile phone, a display 5902 of one embodiment of the present invention, a microphone 5907, a speaker 5904, a camera 5903, an external connection portion 5906, and an operation button 5905 are provided in a housing 5901 with a curved surface. The use of the display 5902 of one embodiment of the present invention enables high-quality images to be displayed regardless of the intensity of external light in the usage environment of the mobile phone and achieves low power consumption.

This embodiment can be combined with any of the other embodiments as appropriate.

This application is based on Japanese Patent Application Serial No. 2016-154192 filed with Japan Patent Office on Aug. 5, 2016, the entire contents of which are hereby incorporated by reference.

What is claimed is:

1. A data processing system comprising:
   a portable terminal;
   a network;
   a server; and
   a database,
   wherein position information is configured to be transmitted from the portable terminal to the server through the network,
   wherein a plurality of pieces of object data corresponding to the position information obtained from the database are configured to be transmitted from the server to the portable terminal through the network,
   wherein imaging data obtained by the portable terminal and the plurality of pieces of object data are configured to be compared,
   wherein, in the case where some of the plurality of pieces of object data does not match the imaging data, the mismatched piece of the object data stored in the database is configured to be updated,
   wherein the database comprises three-dimensional data represented by a wire-frame model, and
   wherein the server is configured to generate two-dimensional data of the plurality of pieces of object data by projecting the three-dimensional data on a two-dimensional plane corresponding to the position information and to transmit the two-dimensional data to the portable terminal through the network.

2. The data processing system according to claim 1, wherein the position information comprises information on a direction in which the portable terminal performs imaging.

3. The data processing system according to claim 1, wherein the portable terminal comprises a display including a light-emitting element.

4. The data processing system according to claim 1, wherein the portable terminal comprises a display including a liquid crystal element.

5. The data processing system according to claim 1, wherein the portable terminal is one of a portable game machine, a wristwatch-type mobile terminal, a tablet personal computer, a video camera, and a mobile phone.

6. The data processing system according to claim 1,
   wherein the portable terminal comprises an arithmetic device, and
   wherein the arithmetic device is configured to compare the imaging data obtained by the portable terminal and the plurality of pieces of object data.

7. The data processing system according to claim 6, wherein the arithmetic device comprises a central processing unit or a field-programmable gate array.

8. A data processing system comprising:
a portable terminal;
a network;
a server; and
a database,
wherein position information is configured to be transmitted from the portable terminal to the server through the network,
wherein a plurality of pieces of object data corresponding to the position information obtained from the database are configured to be transmitted from the server to the portable terminal through the network,
wherein imaging data obtained by the portable terminal and the plurality of pieces of object data are configured to be compared,
wherein the position information is configured to be corrected based on one of the plurality of pieces of object data matching the imaging data,
wherein, in the case where some of the plurality of pieces of object data does not match the imaging data, the mismatched piece of the object data stored in the database is configured to be updated,
wherein the database comprises three-dimensional data represented by a wire-frame model, and
wherein the server is configured to generate two-dimensional data of the plurality of pieces of object data by projecting the three-dimensional data on a two-dimensional plane corresponding to the position information and to transmit the two-dimensional data to the portable terminal through the network.

9. The data processing system according to claim 8, wherein the corrected position information is transmitted from the portable terminal to the server through the network, and
wherein the corrected position information obtained from the database is transmitted from the server to the portable terminal through the network.

10. The data processing system according to claim 8, wherein the position information comprises information on a direction in which the portable terminal performs imaging.

11. The data processing system according to claim 8, wherein the portable terminal comprises a display including a light-emitting element.

12. The data processing system according to claim 8, wherein the portable terminal comprises a display including a liquid crystal element.

13. The data processing system according to claim 8, wherein the portable terminal is one of a portable game machine, a wristwatch-type mobile terminal, a tablet personal computer, a video camera, and a mobile phone.

14. The data processing system according to claim 8, wherein the portable terminal comprises an arithmetic device, and
wherein the arithmetic device is configured to compare the imaging data obtained by the portable terminal and the plurality of pieces of object data.

15. The data processing system according to claim 14, wherein the arithmetic device comprises a central processing unit or a field-programmable gate array.

* * * * *